US007165124B2

(12) United States Patent
Fujita et al.

(10) Patent No.: US 7,165,124 B2
(45) Date of Patent: Jan. 16, 2007

(54) DATA TRANSFER CONTROL SYSTEM, ELECTRONIC INSTRUMENT, PROGRAM, AND DATA TRANSFER CONTROL METHOD

(75) Inventors: Shinichiro Fujita, Kitakyushu (JP); Akemi Ito, Hata-machi (JP); Hiroyuki Kanai, Shiojiri (JP); Koji Nakao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 549 days.

(21) Appl. No.: 10/625,748

(22) Filed: Jul. 24, 2003

(65) Prior Publication Data

US 2004/0167995 A1 Aug. 26, 2004

(30) Foreign Application Priority Data

Aug. 5, 2002 (JP) ............................ 2002-227303

(51) Int. Cl.
*G06F 13/28* (2006.01)

(52) U.S. Cl. ........................... 710/22; 710/5; 710/107; 710/300

(58) Field of Classification Search .................... 710/5, 710/22, 107, 300
See application file for complete search history.

(56) References Cited

U.S. PATENT DOCUMENTS 5,758,075 A * 5/1998 Graziano et al. ........... 709/250
5,974,483 A 10/1999 Ray et al.
6,636,922 B1 * 10/2003 Bastiani et al. ............. 710/305
6,948,025 B1 * 9/2005 Yoshida ...................... 710/315
2001/0042141 A1 11/2001 Matsunaga et al.

FOREIGN PATENT DOCUMENTS

GB 2 002 936 A 2/1979
JP A 01-106254 4/1989
JP A 10-143329 5/1998
JP A 2001-177537 6/2001
JP A 2002-207713 7/2002

OTHER PUBLICATIONS

U.S. Appl. No. 10/781,721, filed Feb. 20, 2001, Fujita et al.
U.S. Appl. No. 10/625,685, filed Jul. 24, 2003, Fujita et al.
U.S. Appl. No. 10/625,625, filed Jul. 24, 2003, Fujita et al.
U.S. Appl. No. 10/625,643, filed Jul. 24, 2003, Fujita et al.

* cited by examiner

*Primary Examiner*—Kim Huynh
*Assistant Examiner*—Eron Sorrell
(74) *Attorney, Agent, or Firm*—Oliff & Berridge, PLC

(57) ABSTRACT

A data transfer control system receives a command packet ORB transferred through a bus BUS1 (IEEE 1394), issues a command indicated by ORB to a device connected to a bus BUS2 (ATA (IDE)/ATAPI), and orders start of a DMA transfer. The command issued based on ORB is aborted after the completion of the DMA transfer. The data transfer control system compares contents of a command packet ORB1 transferred before a bus reset with contents of a command packet ORB2 transferred after the bus reset. If the contents are different, a command issued based on ORB1 is aborted after completion of a DMA transfer. Dummy data is transferred between the data transfer control system and the device connected to the bus BUS2 until a DMA transfer is completed. Dummy data transfer is controlled by performing a dummy update on a pointer.

15 Claims, 19 Drawing Sheets

FIG. 5A
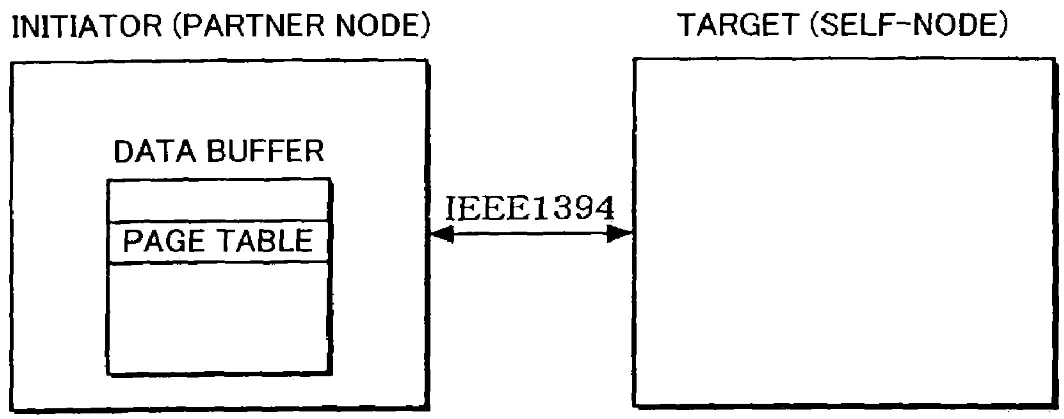
FIG. 5B PAGE TABLE IS PRESENT
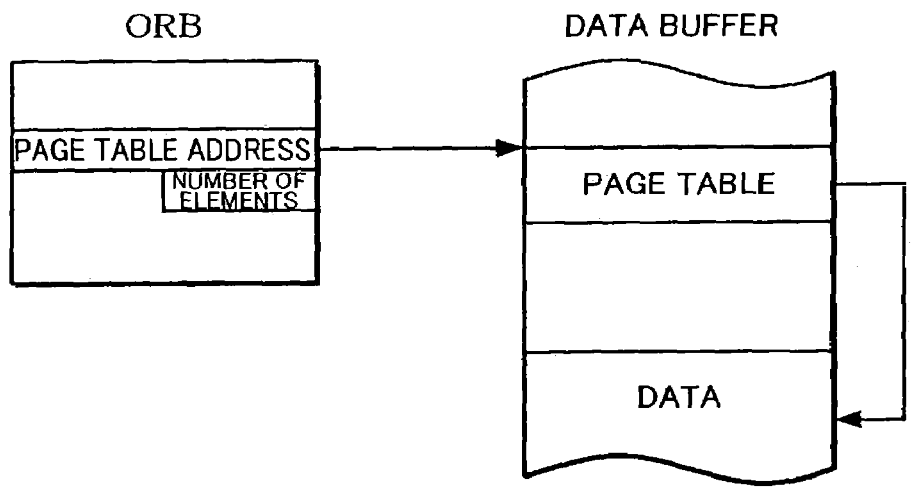
FIG. 5C PAGE TABLE IS NOT PRESENT
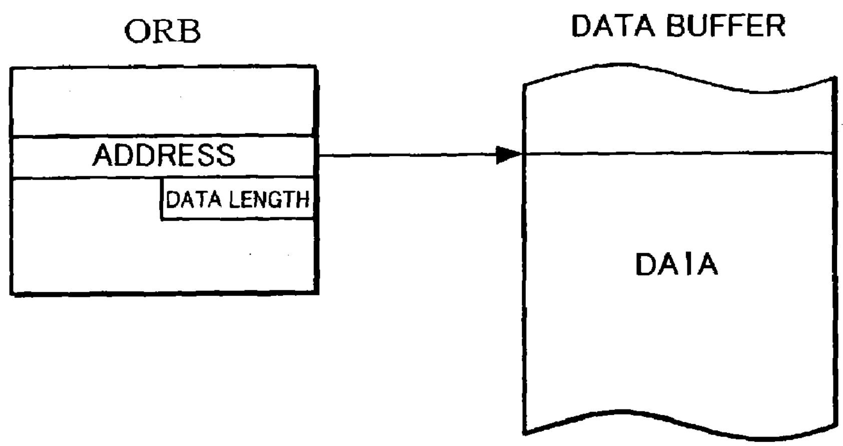

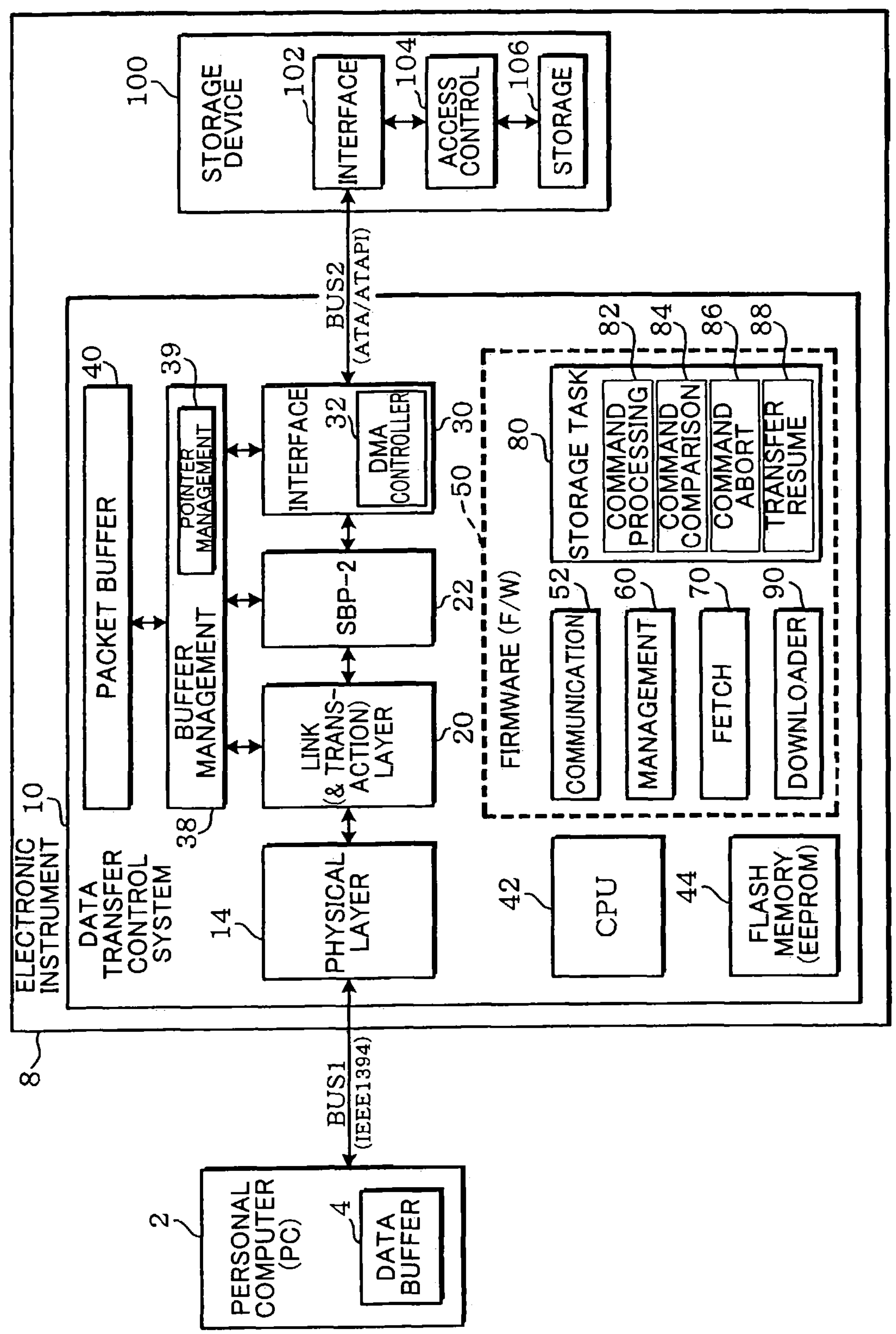
FIG. 8
PERSONAL COMPUTER (PC)
2
4
DATA BUFFER
BUS1 (IEEE1394)
8
ELECTRONIC INSTRUMENT
DATA TRANSFER CONTROL SYSTEM
10
14
PHYSICAL LAYER
LINK (& TRANS-ACTION) LAYER
20
SBP-2
22
INTERFACE
32
DMA CONTROLLER
30
PACKET BUFFER
40
BUFFER MANAGEMENT
38
POINTER MANAGEMENT
39
BUS2 (ATA/ATAPI)
STORAGE DEVICE
100
INTERFACE
102
ACCESS CONTROL
104
STORAGE
106
FIRMWARE (F/W)
50
COMMUNICATION
52
MANAGEMENT
60
FETCH
70
DOWNLOADER
90
STORAGE TASK
80
COMMAND PROCESSING
82
COMMAND COMPARISON
84
COMMAND ABORT
86
TRANSFER RESUME
88
CPU
42
FLASH MEMORY (EEPROM)
44

FIG. 12
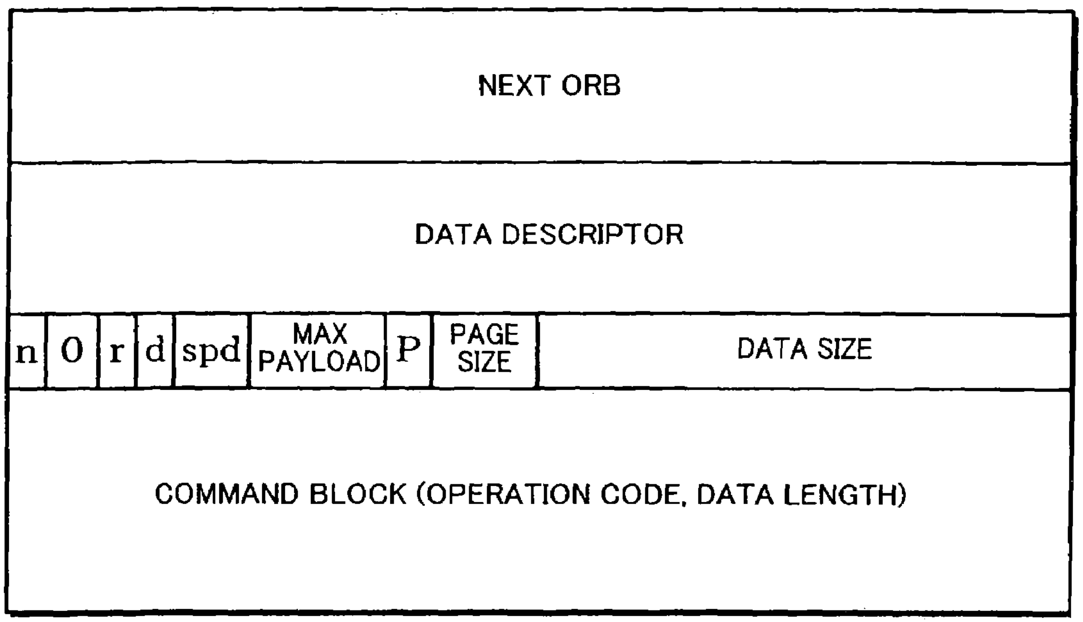
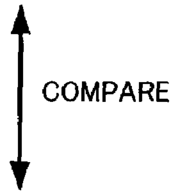
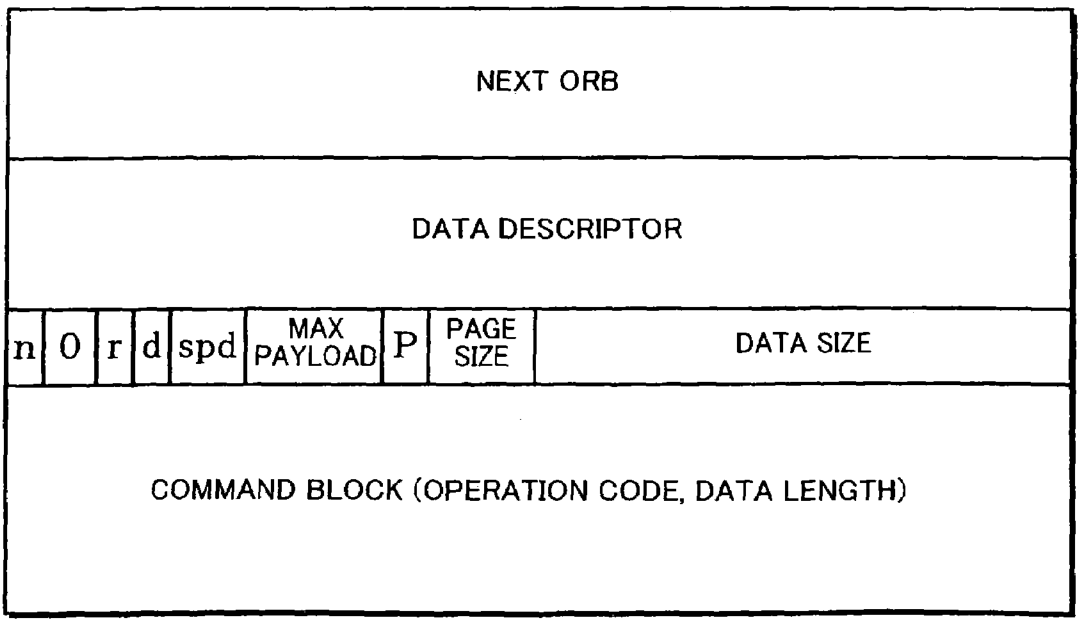

PACKET BUFFER
(BUFFER MANAGEMENT CIRCUIT)
31
FIFO
32
DMA CONTROLLER
33
REGISTER
CPU
34
INTERFACE CORE
35
COUNTER
36
UDMA
37
UDMA FIFO
38
UDMA CRC CALCULATION
CS[1:0]
DA[2:0]
DMARQ
DMACK
DIOW
DIOR
IORDY
DD[15:0]
ATA (IDE)/ATAPI
(STORAGE DEVICE)
INTERFACE

PIO READ (STORAGE DEVICE → DATA TRANSFER CONTROL SYSTEM → PC)

PIO WRITE (PC → DATA TRANSFER CONTROL SYSTEM → STORAGE DEVICE)

DMA READ (STORAGE DEVICE → DATA TRANSFER CONTROL SYSTEM → PC)

DMA WRITE (PC → DATA TRANSFER CONTROL SYSTEM → STORAGE DEVICE)

UltraDMA READ (STORAGE DEVICE → DATA TRANSFER CONTROL SYSTEM → PC)

UltraDMA WRITE (PC → DATA TRANSFER CONTROL SYSTEM → STORAGE DEVICE)

DATA TRANSFER CONTROL SYSTEM, ELECTRONIC INSTRUMENT, PROGRAM, AND DATA TRANSFER CONTROL METHOD

Japanese Patent Application No. 2002-227303 filed on Aug. 5, 2002, is hereby incorporated by reference in its entirety.

BACKGROUND OF THE INVENTION

The present invention relates to a data transfer control system, an electronic instrument, a program, and a data transfer control method.

In recent years, an interface standard called IEEE 1394 has attracted attention. Not only can computer peripherals such as hard disk drives, optical disk drives, printers, and scanners be connected to a bus under this IEEE 1394, but also domestic electrical products such as video cameras, VCRs, and TVs. That is why this standard is expected to enable a dramatic acceleration in the digitalization of electronic instruments.

In the IEEE 1394, when the number of nodes connected to a bus is changed, such as when an additional electronic instrument is connected to the bus or when an electronic instrument is removed from the bus, a bus reset occurs. If a bus reset occurs, node topology information is cleared. The node topology information is automatically recreated after the bus reset.

In IEEE 1394, since the node topology information is automatically recreated after the bus reset, a so-called hot plug is enabled. That is, a user can plug and unplug electronic instruments at any time in the same manner as in conventional domestic electrical appliances such as VCRs. This contributes to popularization of a home network system.

However, various problems may be caused by the bus reset. When a command is issued to a hard disc drive (or a storage device in a broad sense, or a device in a broader sense) and a direct memory access (DMA) transfer is initiated, if a bus reset occurs during the DMA transfer, the hard disc drive may hang up, for example.

As conventional technique for solving various problems caused by the occurrence of the bus reset, a technique disclosed in Japanese Patent Application Laid-open No. 2001-177537 is known, for example.

BRIEF SUMMARY OF THE INVENTION

According to one aspect of the present invention, there is provided a data transfer control system for data transfer through a bus, comprising:

a command processing section which receives a command packet transferred through a first bus, issues a command indicated by the command packet to a device connected to a second bus, and orders start of a direct memory access (DMA) transfer through the second bus; and a command abort section which aborts the command issued to the device connected to the second bus based on the command packet after the completion of the DMA transfer started based on the command packet.

BRIEF DESCRIPTION OF THE SEVERAL VIEWS OF THE DRAWING

FIGS. 5A to 5C are diagrams for describing a page table.

FIG. 8 is a diagram showing a configurational example of a data transfer control system and an electronic instrument in one embodiment of the present invention.

FIG. 12 is a diagram illustrative of comparison of contents of ORBs.

DETAILED DESCRIPTION OF THE EMBODIMENT

Embodiments of the present invention are described below.

Note that the embodiments described below do not in any way limit the scope of the invention laid out in the claims herein. In addition, all elements of the embodiments described below should not be taken as essential requirements of the present invention.

1. IEEE 1394 and SBP-2

1.1 Layer Structure

A protocol called Serial Bus Protocol 2 (SBP-2) has been proposed as a higher level protocol including a part of a function of a transaction layer of IEEE 1394. SBP-2 (SBP in a broad sense) has been proposed to enable a command set of SCSI (MMC-2) to be utilized on the protocol of IEEE 1394. SBP-2 enables a command set which has been used in an electronic instrument conforming to the SCSI standard to be used in an electronic instrument conforming to the IEEE 1394 standard by merely adding minimum changes to the command set. Therefore, the design and development of an electronic instrument can be facilitated.

Figure 1:
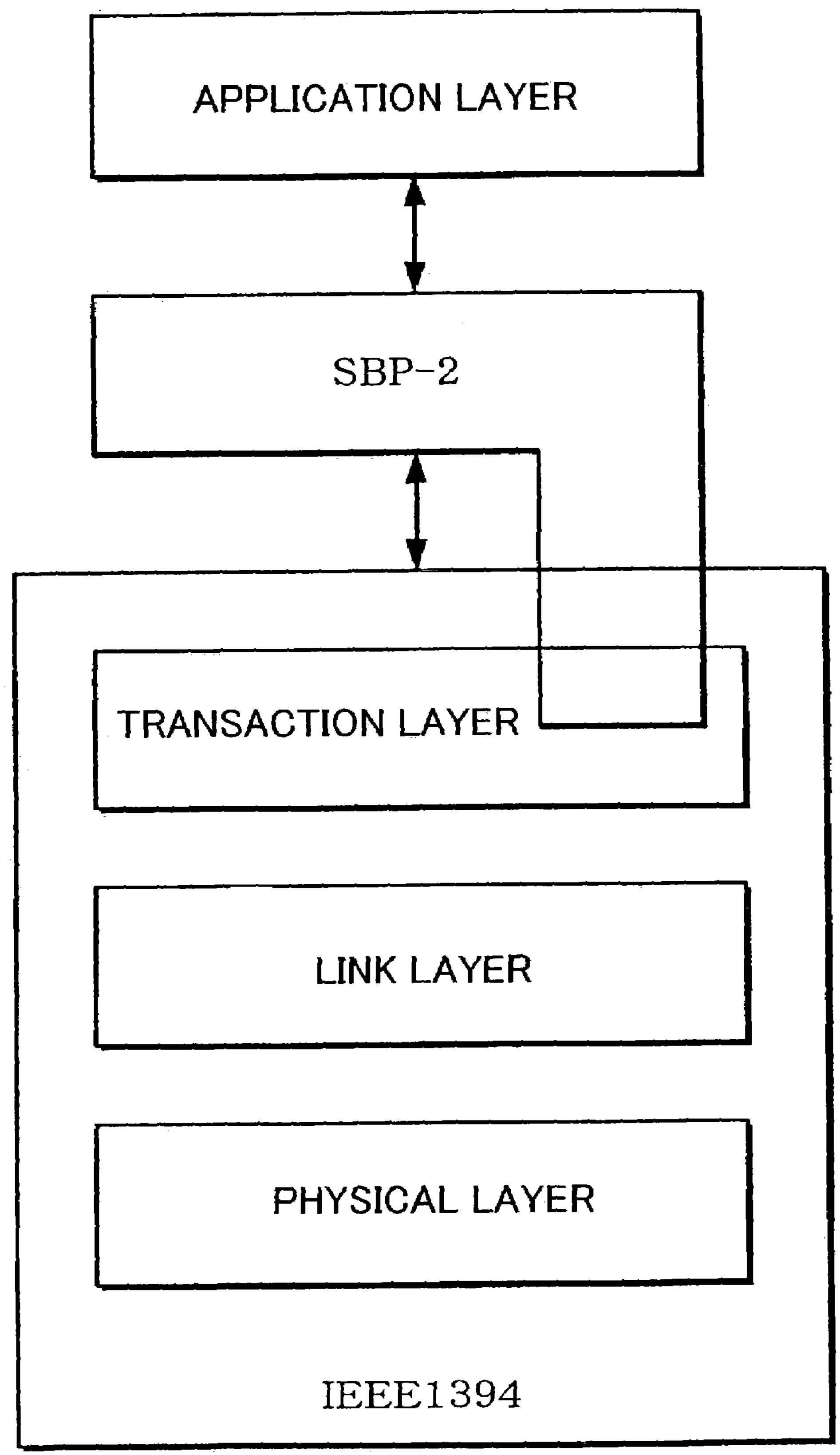
FIG. 1 is a diagram illustrative of a layer structure of IEEE 1394 and Serial Bus Protocal 2 (SBP-2).

FIG. 1 schematically shows a layer structure (or a protocol stack) of IEEE 1394 and SBP-2.

The protocols of IEEE 1394 (IEEE 1394-1995, P1394a, P1394b, etc.) include a transaction layer, a link layer, and a physical layer.

The transaction layer provides an upper layer with an interface (service) in a transaction unit, and performs transactions such as a read transaction, write transaction, and lock transaction through an interface provided by the link layer in a lower layer.

In the read transaction, data is transferred to a requester node from a responder node. In the write, transaction, data is transferred to the responder node from the requester node. In the lock transaction, data is transferred to the responder node from the requester node, and the responder node processes the data and returns the processed data to the requester node.

The link layer provides addressing, data checking, data framing for packet transmission and reception, cycle control for isochronous transfer, and the like.

The physical layer translates logical symbols used by the link layer into electrical signals, arbitrates for the bus, and provides a physical bus interface.

As shown in FIG. 1, an SBP-2 layer provides a higher level protocol including a part of the function of the transaction layer of IEEE 1394 (first interface standard in a broad sense).

1.2 Processing of SBP-2

Figure 2:
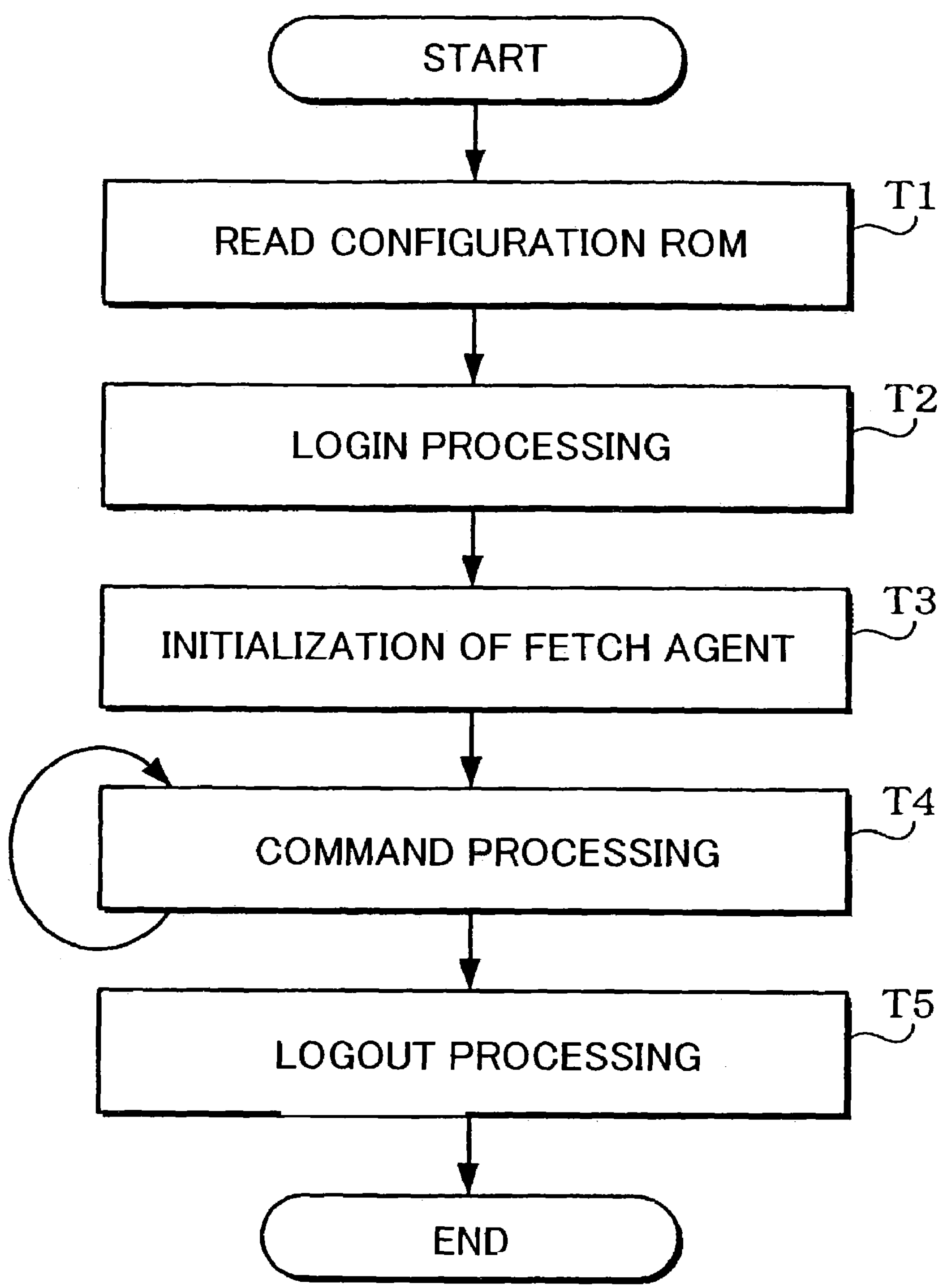
FIG. 2 is a diagram illustrative of a summary of processing of SBP-2.

FIG. 2 shows a flowchart of the entire processing of SBP-2 (first higher level protocol of the first interface standard in a broad sense).

In SBP-2, read processing of a configuration ROM is performed for confirming connected devices as shown in FIG. 2 (step T1).

Login processing for allowing an initiator (personal computer, for example) to acquire an access right to a target (storage device, for example) (request initiation permission; right to use the bus) is performed (step T2). In more detail, the login processing is performed by using a login operation request block (ORB) created by the initiator.

A fetch agent is initialized (step T3). Command processing is performed by using a command block ORB (normal command ORB) (step T4), and logout processing is performed by using a logout ORB. (step T5).

Figure 3:
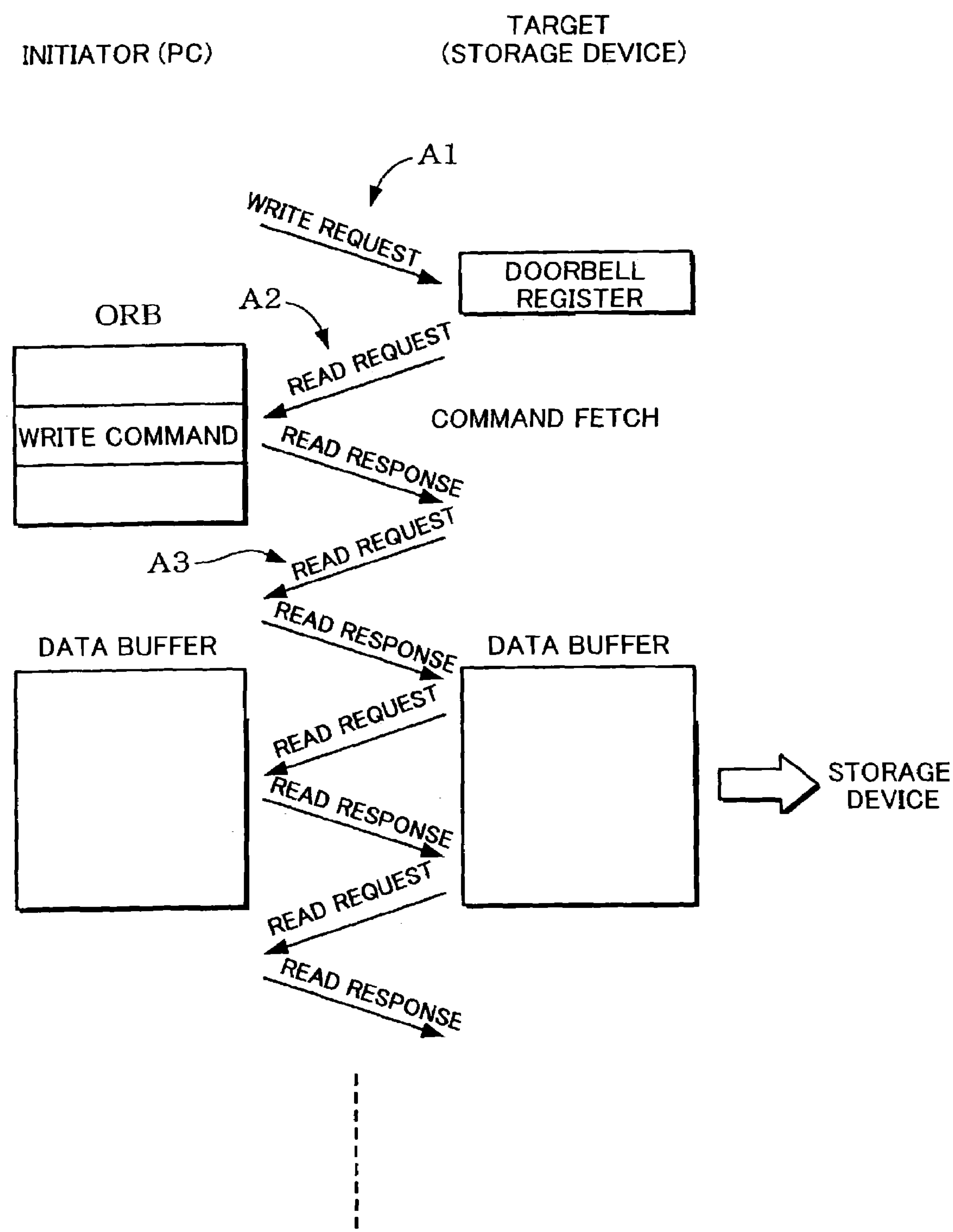
FIG. 3 is a diagram illustrative of command processing in the case of transferring data from an initiator to a target in SBP-2.

In the command processing in the step T4, the initiator transfers a write request packet (issues a write request transaction) to ring a doorbell register of the target, as indicated by A1 in FIG. 3. The target transfers a read request packet, and the initiator returns a read response packet corresponding to the read request packet, as indicated by A2. This allows the ORB (command block ORB) created by the initiator to be fetched in a data buffer (packet buffer) of the target. The target analyzes a command included in the ORB fetched in the data buffer.

If the command included in the ORB is a SCSI write command, the target transfers a read request packet to the initiator, and the initiator returns a read response packet corresponding to the read request packet, as indicated by A3. This allows data stored in a data buffer of the initiator to be transferred to the target. In the case where the target is a storage device, the transferred data is written in the storage device.

Figure 4:
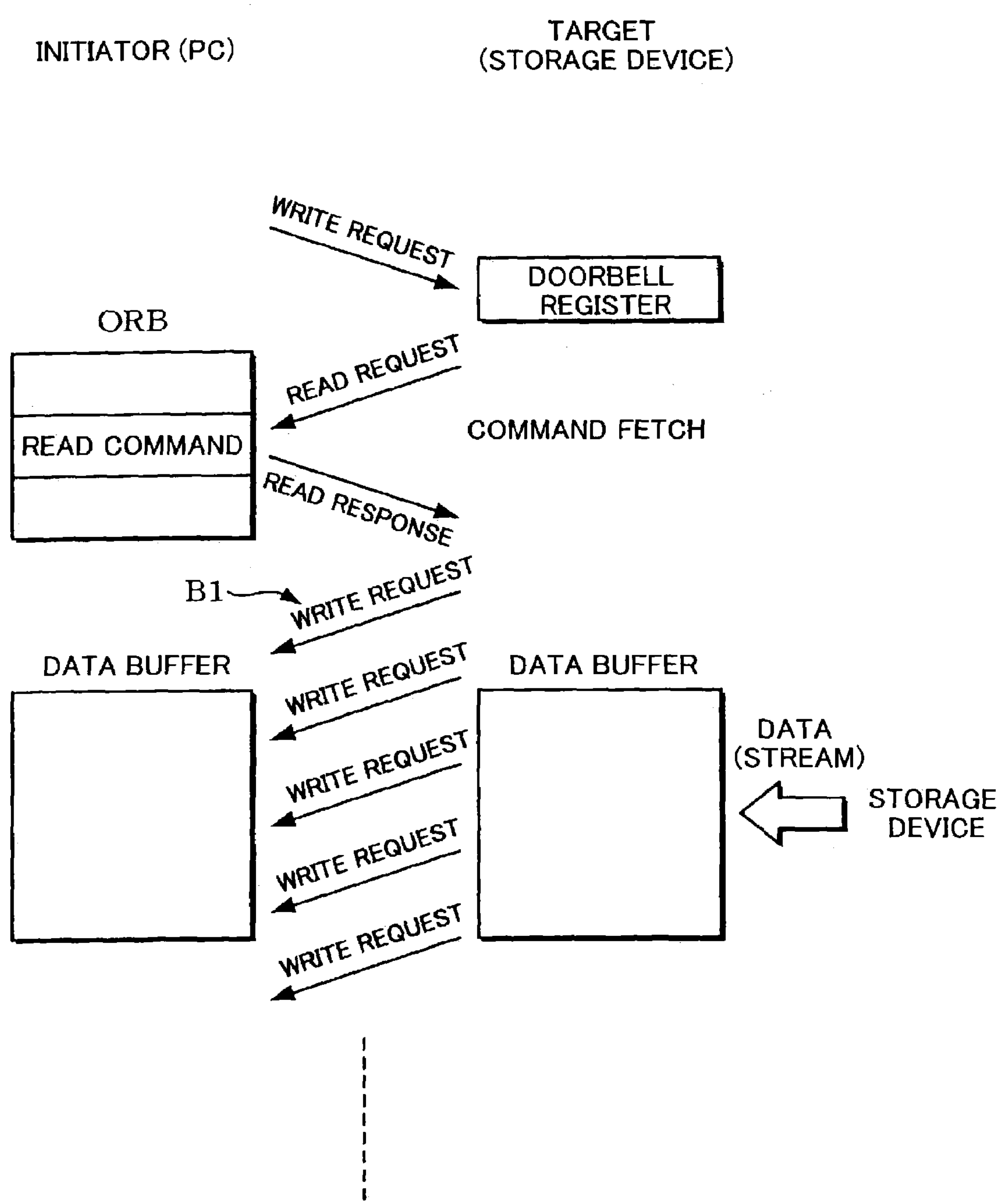
FIG. 4 is a diagram illustrative of command processing in the case of transferring data from a target to an initiator in SBP-2.

If the command included in the ORB is a SCSI read command, the target transfers a series of write request packets to the initiator, as indicated by B1 in FIG. 4. In the case where the target is a storage device, data read from the storage device is transferred to the data buffer of the initiator.

According to SBP-2, the target can transmit or receive data by transferring a request packet (issuing a transaction) at its convenience. Therefore, since it is unnecessary for the initiator and the target to operate in synchronization, data transfer efficiency can be increased.

As a higher level protocol of IEEE 1394, an AV/C command which is suitable for transferring image and sound data has been proposed in addition to SBP-2 which is suitable for transferring data of a storage device or a printer. As a protocol for transferring internet protocol (IP) packets on the IEEE 1394 bus, a protocol called IPover1394 has also been proposed.

In the case of transferring data between the target and the initiator, there may be a case where a page table is present in the data buffer of the initiator (personal computer or partner node) as shown in FIG. 5A, and a case where a page table is not present in the data buffer of the initiator.

In the case where a page table is present, the page table address and the number of elements are included in an ORB created by the initiator, as shown in FIG. 5B. The address (read address or write address) of data to be transferred is indirectly addressed by using the page table.

In the case where a page table is not present, an address and data length are included in the ORB and data to be transferred is directly addressed, as shown in FIG. 5C.

1.3 Bus Reset

In IEEE 1394, a bus reset occurs (is issued) when power to a device is turned on or a device is plugged in or unplugged in the middle of a transaction. Specifically, each node monitors a change in voltage of the port. If the voltage of the port is changed due to connection of a new node with the bus or the like, a node which detects the voltage change notifies other nodes on the bus of occurrence of the bus reset. The physical layer of each node notifies the link layer of occurrence of the bus reset.

Figure 6:
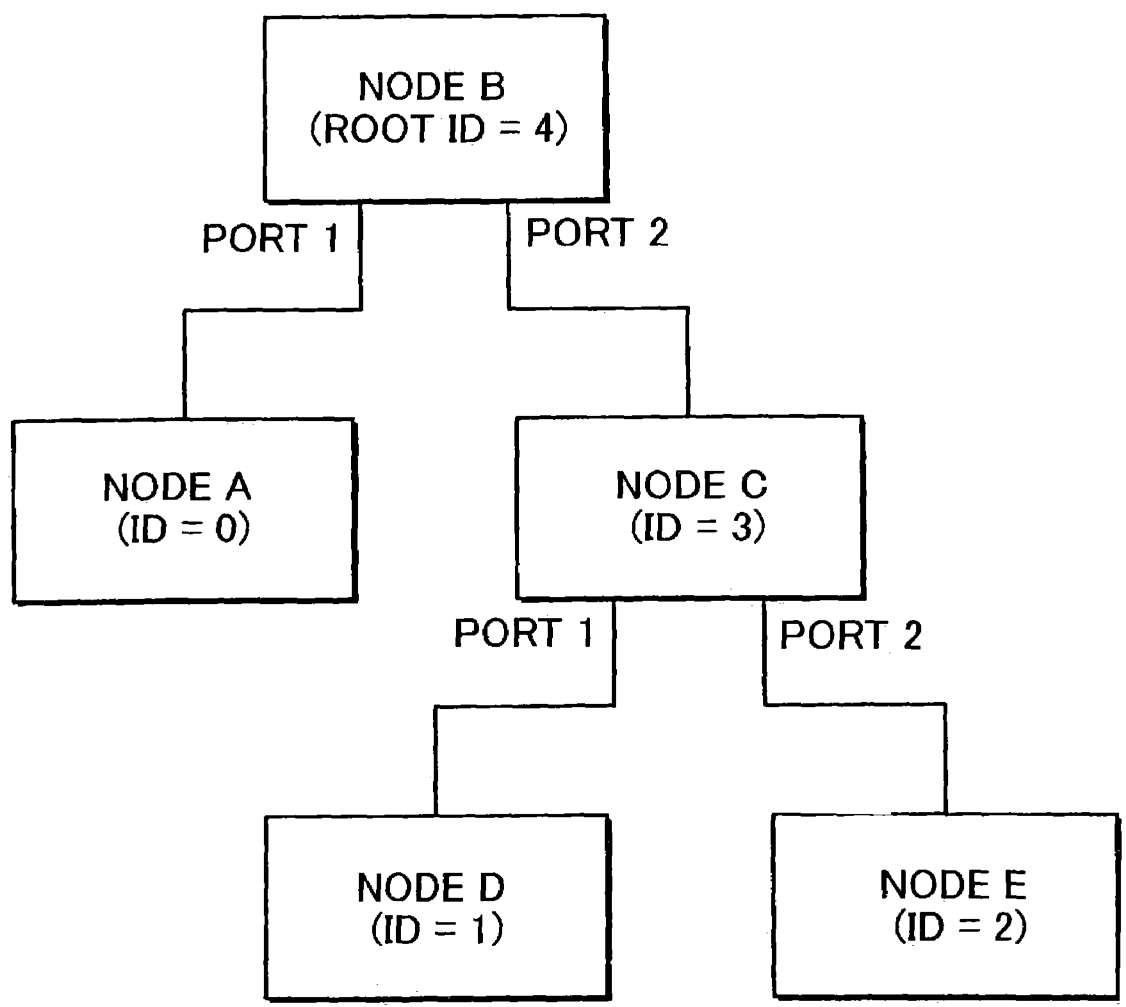
FIG. 6 is a diagram illustrative of node topology information which is cleared by a bus reset.

If the bus reset occurs, topology information (node ID and the like) shown in FIG. 6 is cleared. The topology information is then automatically recreated. Specifically, tree identify and self-identify processes are performed after the bus reset. Management nodes such as an isochronous resource manager, a cycle master, and a bus manager are then determined, and normal packet transfer is resumed.

In IEEE 1394, since the topology information is automatically recreated after the bus reset, a cable can be plugged into or unplugged from an electronic instrument at any time, whereby a so-called hot plug can be implemented.

In the case where the bus reset occurs in the middle of a transaction, the transaction is canceled. The requester node which has issued the canceled transaction retransfers the request packet after the topology information is recreated. The responder node must not return the response packet of the transaction canceled by the bus reset to the requester node.

1.4 Hang-up Due to Bus Reset

It was found that the following problem occurs if the bus reset occurs during data transfer.

Figure 7A:
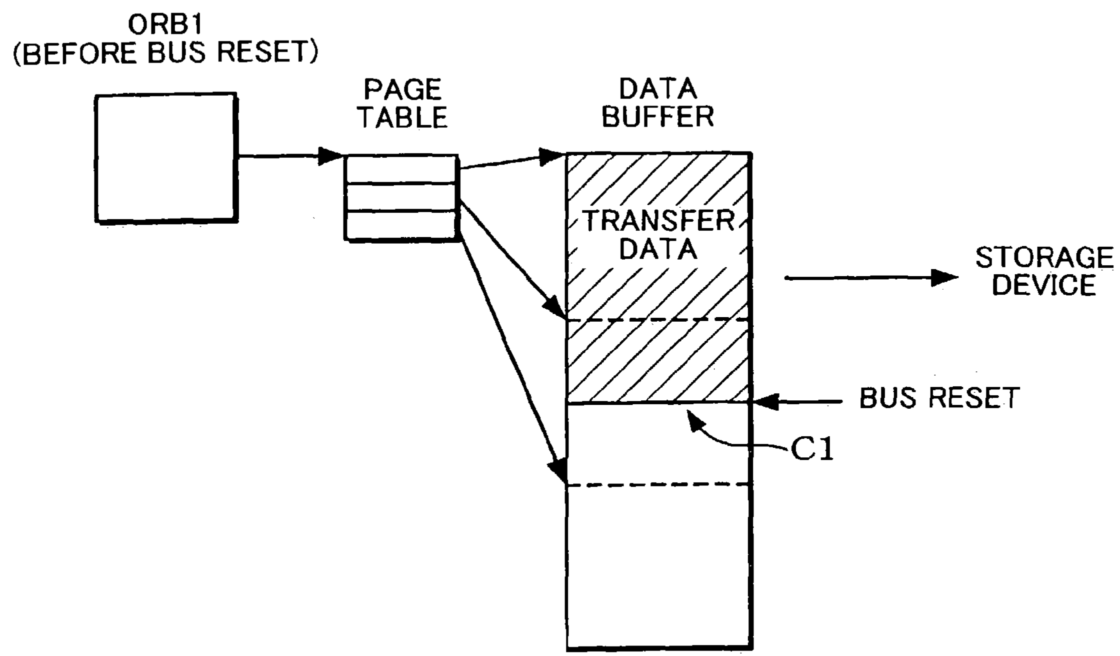
FIGS. 7A and 7B are diagrams for describing a problem which occurs when a bus reset occurs during data transfer.
Figure 7B:
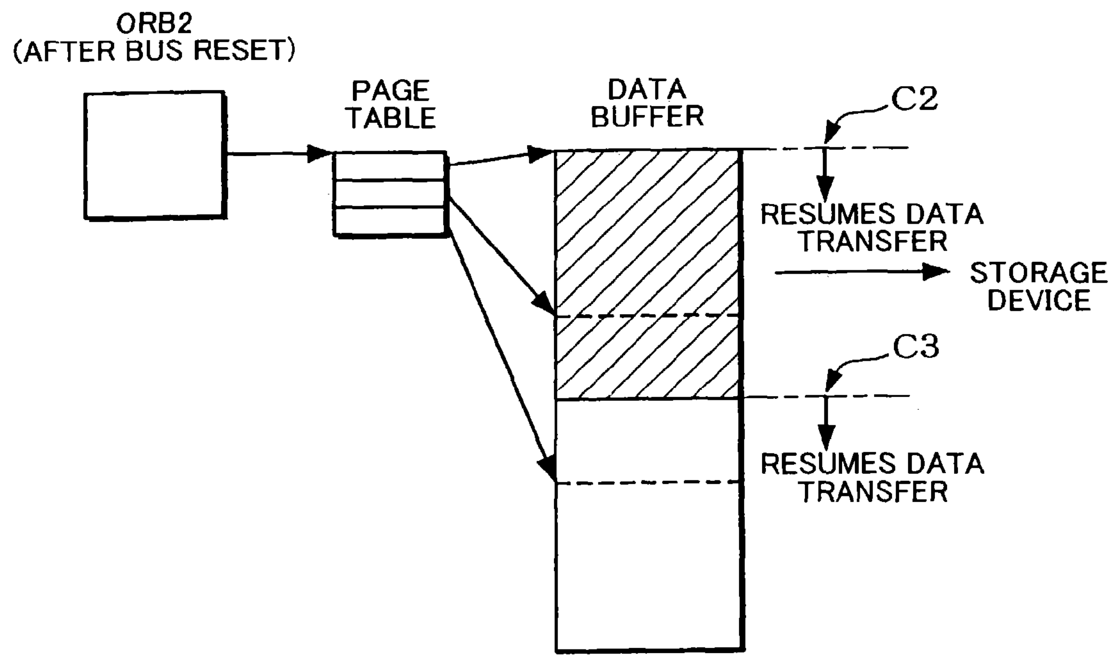

As shown in FIG. 7A, the bus reset occurs after data at a location (address) indicated by C1 is transferred, for example. In this case, all transactions which are being processed when the bus reset occurs are canceled. Therefore, the initiator such as a personal computer which has requested data transfer by using an ORB transferred before the bus reset (hereinafter may be called "ORB1") recreates an ORB transferred after the bus reset (hereinafter may be called "ORB2"), and orders the target such as a storage device to retransfer data, as shown in FIG. 7B. Therefore, data transfer is resumed at a location indicated by C2 in FIG. 7B, whereby data is transferred twice.

In order to solve this problem, the technology disclosed in Japanese Patent Application Laid-open No. 2001-177537 employs a method of comparing the contents of the ORB1 before the bus reset with the contents of the ORB2 after the bus reset, and resuming data transfer at a location indicated by C3 in FIG. 7B if the contents of the ORB1 are the same as the contents of the ORB2.

However, depending on the architecture of the operating system (OS) of the personal computer, an ORB2 having contents differing from the contents of the ORB1 before the bus reset may be transferred from the personal computer after the bus reset.

For example, the ORB1 contains the SCSI (MMC-2) write command as shown in FIG. 3, and the bus reset occurs during data transfer based on the write command. In this case, the OS of the personal computer may send an ORB2 containing a read command for a file allocation table (FAT) after the bus reset in order to check the contents of the FAT.

In this case, since the data write command is indicated by the ORB1 before the bus reset and the FAT read command is indicated by the ORB2 after the bus reset, the contents of the ORB1 differ from the contents of the ORB2. Therefore, the write command of the ORB1 which has been issued to the storage device in the subsequent stage must be aborted.

However, in the case where the DMA transfer has already been started (or initiated) based on the write command of the ORB1 before the bus reset, a problem in which the storage device in the subsequent stage hangs occurs if the write command is aborted.

2. Entire Configuration

FIG. 8 shows an entire configuration example of a data transfer control system capable of solving the above problem and an electronic instrument including the data transfer control system. The following description is given taking a case where a target which performs data transfer between the initiator and the target is a storage device (hard disk drive, CD drive, DVD drive, or the like) as an example. However, the present invention is not limited thereto.

A personal computer (host computer) 2 including a data buffer 4 is connected to an electronic instrument 8 through a bus BUS1 (first bus) conforming to IEEE 1394. The electronic instrument 8 includes a data transfer control system 10 and a storage device 100 (device in a broad sense).

The electronic instrument 8 may include a system CPU, a system memory (ROM and RAM), an operating section, a signal processing device, and the like (not shown).

The data transfer control system 10 includes a physical layer (PHY) circuit 14, a link layer circuit 20, an SBP-2 circuit 22, an interface circuit 30, a packet management circuit 38, and a packet buffer 40 (data buffer). The data transfer control system 10 includes a CPU 42 and a flash memory 44 (EEPROM). The data transfer control system 10 includes firmware 50 of which processing modules (program) are stored in the flash memory 44 and which is executed by the CPU 42 (processor in a broad sense). The data transfer control system 10 in this embodiment does not necessarily include all the circuit blocks and functional blocks shown in FIG. 8. Some of the circuit blocks and functional blocks may be omitted.

The physical layer circuit 14 is a circuit for implementing the protocol of the physical layer shown in FIG. 1 by the hardware. The physical layer circuit 14 has a function of translating logical symbols used by the link layer circuit 20 into electrical signals.

The link (& transaction) layer circuit 20 is a circuit for implementing a part of the protocols of the link layer and the transaction layer shown in FIG. 1 by the hardware. The link layer circuit 20 provides various services for packet transfer between the nodes.

Data transfer conforming to IEEE 1394 can be performed between the electronic instrument 8 and the personal computer 2 (an electronic instrument: in a broad sense) through the bus BUS1 (first bus) by utilizing the functions of the physical layer circuit 14 and: the link layer circuit 20.

The SBP-2 circuit 22 (transfer execution circuit) is a circuit which implements a part of the SBP-2 protocol and a part of the transaction layer by the hardware. Processing for dividing transfer data into a series of packets and continuously transferring the divided series of packets can be implemented by the function of the SBP-2 circuit 22.

The interface circuit 30 is a circuit which performs interface processing between the data transfer control system 10 and the storage device 100. Data transfer conforming to AT Attachment (ATA) and ATA Packet Interface (ATAPI) can be performed between the data transfer control system 10 and the storage device 100 through a bus BUS2 (second bus) by the function of the interface circuit 30.

The data transfer control system 10 can be provided with a conversion bridge function between IEEE 1394 (first interface standard in a broad sense) and ATA (IDE)/ATAPI (second interface standard in a broad sense) by providing the physical layer circuit 14, the link layer circuit 20, and the interface circuit 30 as shown in FIG. 8.

A DMA controller 32 included in the interface circuit 30 is a circuit for performing direct memory access (DMA) transfer between the data transfer control system 10 and the storage device 100 through the bus BUS2.

The storage device 100 connected to the bus BUS2 includes an interface circuit 102 for performing data transfer conforming to ATA (IDE)/ATAPI, and an access control circuit 104 which controls access (write or read) to a storage 106 such as a hard disk or optical disk.

The buffer management circuit 38 is a circuit which manages an interface between the packet buffer 40 and the link layer circuit 20 and the like. The buffer management circuit 38 includes registers for controlling the buffer management circuit 38, an arbitration circuit which arbitrates for bus connection to the packet buffer 40, a sequencer which generates various control signals, and the like.

The buffer management circuit 38 includes a pointer management section 39. The pointer management section 39 manages pointers of the packet buffer 40 by using a ring buffer, and updates a plurality of pointers for writing and reading.

The packet buffer 40 (packet memory or data buffer) is a buffer for temporarily storing packets (transferred data), and is formed by hardware such as an SRAM, SDRAM, or DRAM. In this embodiment, the packet buffer 40 functions as a randomly accessible packet storage section. The packet buffer 40 may not be included in the data transfer control system 10 and be provided externally.

The CPU 42 (processor in a broad sense) controls the entire device and data transfer.

The flash memory 44 (EEPROM) is an electrically erasable programmable nonvolatile memory. The processing modules (program) of the firmware 50 are stored in the flash memory 44.

The firmware 50 is a program which includes various processing modules (processing routines) and operates on the CPU 42. The protocols of the transaction layer and the like are implemented by the firmware 50 and the hardware such as the CPU 42.

The firmware 50 (F/W) includes a communication section 52, a management section 60, a fetch section 70, a storage task section 80, and a downloader 90. The firmware 50 does not necessarily include all of these functional blocks. Some of the functional blocks may be omitted.

The communication section 52 is a processing module which functions as an interface between the firmware 50 and the hardware such as the physical layer circuit 14 and the link layer circuit 20.

The management section 60 (management agent) is a processing module which manages a login, reconnect, logout, reset, and the like. In the case where the initiator requests a login to the target, the management section 60 receives the login request.

The fetch section 70 (fetch agent) is a processing module which receives an operation request block (ORB), issues a command status, and requests the storage task section 80 to perform command processing. The fetch section 70 can also handle a link list of an ORB fetched by the fetch section 70 in response to the request from the initiator, differing from the management section 60 which can handle only a single request.

The storage task section 80 is a processing module for processing a command included in an ORB and processing DMA transfer.

The downloader 90 is a processing module for updating the processing module of the firmware 50 stored in the flash memory 44 and the like.

The storage task section 80 includes a command processing section 82, a command comparison section 84, a command abort section 86, and a transfer resume section 88.

The command processing section 82 performs various types of processing of an ORB (command packet or a command packet for data transfer operation request in a broad sense) transferred through the bus BUS1 (first bus conforming to the first interface standard such as IEEE 1394). In more detail, the command processing section 82 receives an ORB from the bus BUS1, issues a command (SCSI or MMC-2 command) included in the ORB to the storage device 100 (device in a broad sense) connected to the bus BUS2 (second bus of the second interface standard such as ATA/ATAPI), and orders start of DMA transfer (data transfer without involving the CPU) through the bus BUS2.

If the bus reset (reset which clears node topology information) occurs during processing of an ORB (during data transfer based on the ORB), the command comparison section 84 compares the contents of the ORB1 transferred through the bus BUS1 before the bus reset with the contents of an ORB2 transferred through the bus BUS1 after the bus reset.

The command abort section 86 aborts the command (SCSI read command, SCSI write command, or the like) which has been issued to the storage device 100 based on the ORB after completion of the DMA transfer (continuous data transfer) started based on the ORB (command).

In more detail, if the contents of the ORB1 before the bus reset are determined to differ from the contents of the ORB2 after the bus reset, the command abort section 86 aborts (terminates or cancels) the command which has been issued to the storage device 100 based on the ORB1 after completion of the DMA transfer initiated based on the ORB1 (command).

In this case, the command abort section 86 controls so that dummy data is transferred between the data transfer control system 10 and the storage device 100 until the DMA transfer started based on the ORB is completed.

In the data transfer control system 10 in this embodiment having a bus conversion bridge function, data transferred from the storage device 100 through the bus BUS2 is transferred to the personal computer 2 through the bus BUS1. Data transferred from the personal computer 2 through the bus BUS1 is transferred to the storage device 100 through the bus BUS2.

In the dummy data transfer, dummy data is transferred to the data transfer control system 10 from the storage device 100 through the bus BUS2, but is not transferred to the personal computer 2. Dummy data is transferred to the storage device 100 through the bus BUS2 even if data is not transferred to the data transfer control system 10 from the personal computer 2 through the bus BUS1.

The command abort section 86 performs the abort processing after reconnect processing performed after the bus reset is completed.

The transfer resume section 88 performs processing for resuming data transfer where the bus reset occurred (data subsequent to the data transferred when the bus reset occurred) if the contents of the ORB1 before the bus reset are determined to be the same as the contents of the ORB2 after the bus reset.

3. Details of Processing

Details of processing in this embodiment are described below using flowcharts shown in FIGS. 9 and 10 and the like.

Figure 9:
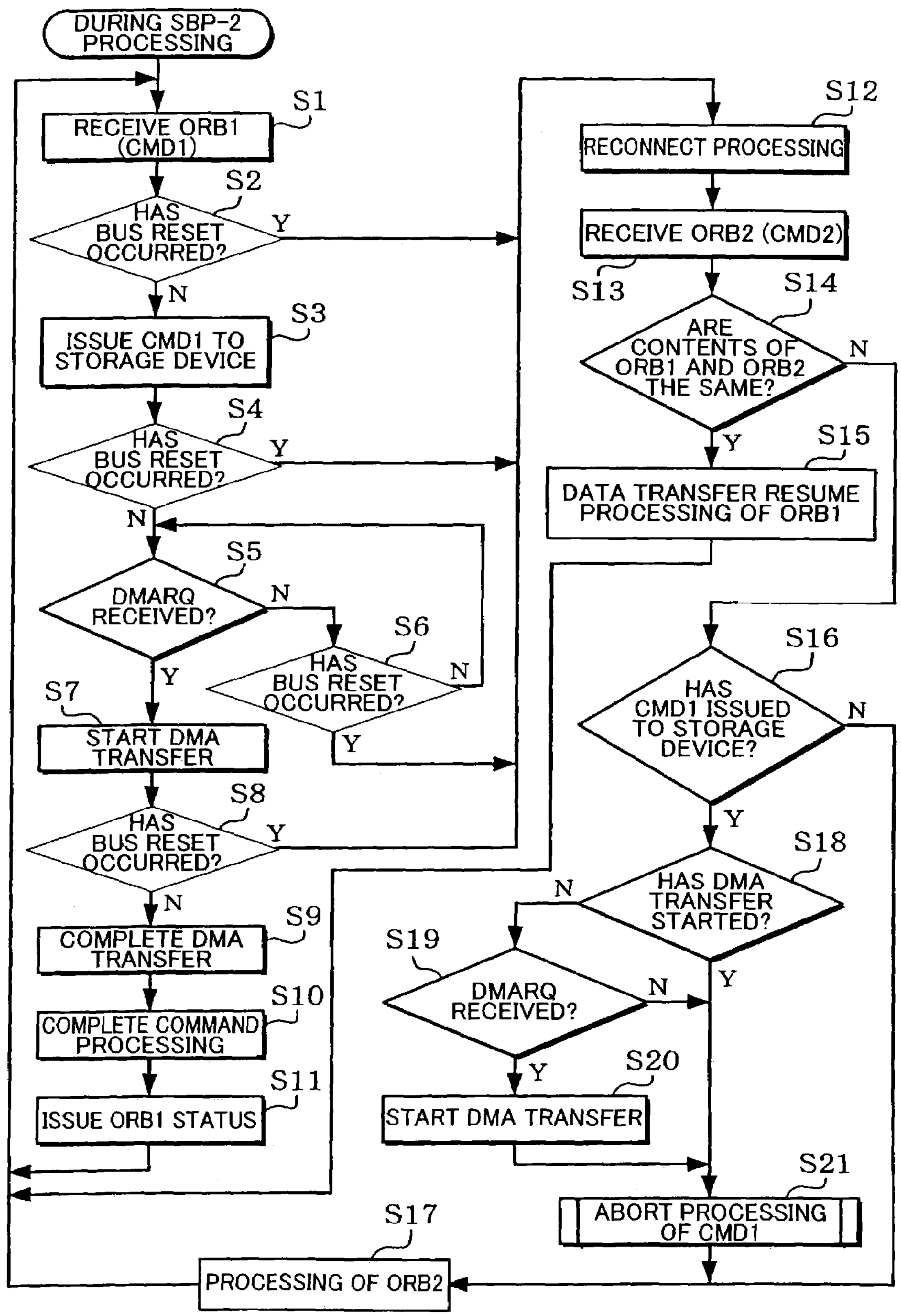
FIG. 9 is a flowchart showing a detailed processing according to one embodiment of the present invention.

FIG. 9 is a flowchart showing overall processing in this embodiment.

If the data transfer control system 10 receives an ORB1 including a command CMD1 during SBP-2 processing (step S1), the data transfer control system 10 judges whether or not the bus reset has occurred (step S2). If the bus reset has not occurred, the data transfer control system 10 issues the command CMD1 included in the ORB1 to the storage device 100 (hard disk drive) as indicated by D1 in FIG. 11 (step S3).

Specifically, since commands similar to those of SCSI (MMC-2) (read, write, mode sense, mode select, and the like) are used in SBP-2, the storage device 100 performs operations such as reading or writing by using these commands. The data transfer control system 10 in this embodiment retrieves the command CMD1 included in the ORB1, and issues the command CMD1 to the storage device 100 through the interface circuit 30 and the bus BUS2 (ATA/ATAPI).

After issuing the command CMD1, the data transfer control system 10 judges whether or not the bus reset has occurred (step S4). If the bus reset has not occurred, the data transfer control system 10 judges whether or not a signal DMARQ has been sent from the storage device 100 through the bus BUS2 (step S5).

Specifically, signals such as the DMA transfer request signal DMARQ and a DMARQ acknowledge signal DMACK are defined for the bus BUS2 conforming to ATA/ATAPI as described later. If the interface circuit 102 of the storage device 100 activates the signal DMARQ and the interface circuit 30 of the data transfer control system 10 then activates the signal DMACK, DMA transfer is started.

If the signal DMARQ has not been sent from the storage device 100, the data transfer control system 10 judges whether or not the bus reset has occurred (step S6). If the bus reset has not occurred, the data transfer control system 10 judges whether or not the signal DMARQ has been sent from the storage device 100. The data transfer control system 10 repeats the judgment in the steps S5 and S6 until the signal DMARQ is sent from the storage device 100.

If the signal DMARQ is sent from the storage device 100, the data transfer control system 10 orders start of DMA transfer by activating the signal DMACK and the like (step S7). This allows data transfer through the bus BUS1 (IEEE 1394) and the bus BUS2 (ATA/ATAPI) to be performed, as indicated by D2 and D3 in FIG. 11.

Data transfer through the bus BUS1 is implemented by the physical layer circuit 14, the link layer circuit 20, the SBP-2 circuit 22, and the like. This allows data stored in the data buffer 4 of the personal computer 2 to be written in the packet buffer 40, or data stored in the packet buffer 40 to be read into the data buffer 4.

Data transfer through the bus BUS2 is implemented by the interface circuit 30 and the like. This allows data stored in the packet buffer 40 to be written in the storage 106 of the storage device 100, or data stored in the storage 106 to be read into the packet buffer 40.

The data transfer control system 10 judges whether or not the bus reset has occurred (step S8). If the bus reset has not occurred and the DMA transfer is completed (step S9), the data transfer control system 10 finishes command processing of the command ORB1 (step S10), and notifies the personal computer 2 of the status of the command ORB1 (step S11). A series of command processing of the command ORB1 is completed in this manner.

Figure 11:
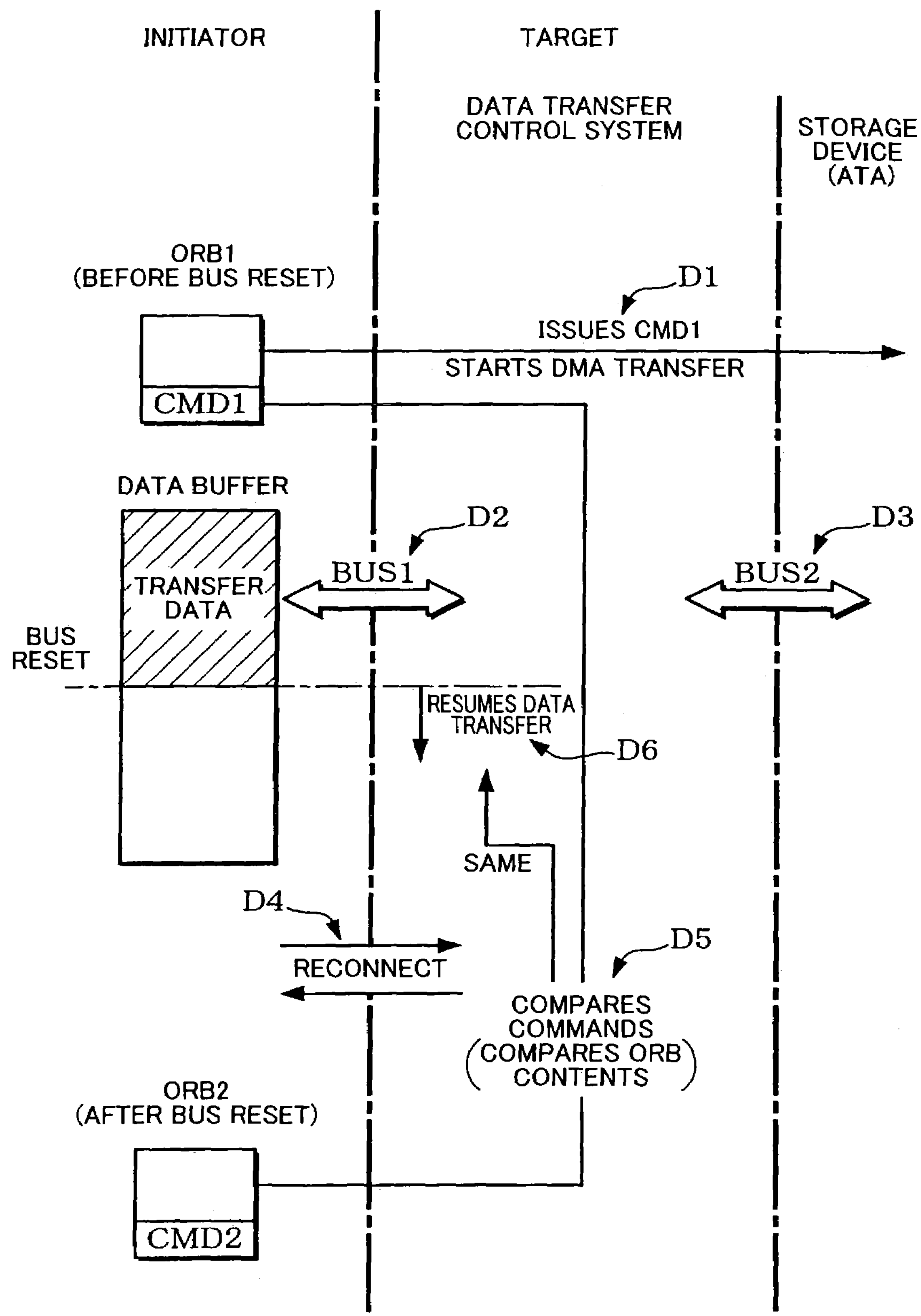
FIG. 11 is a diagram illustrative of resume processing of data transfer.

If the data transfer control system 10 judges that the bus reset has occurred in the step S2, S4, S6, or S8, reconnect processing in which the data transfer control system 10 waits for the initiator to reconnect is performed, as indicated by D4 in FIG. 11 (step S12).

In SBP-2, an initiator which had logged in to a target before the bus reset can preferentially reconnect with the target for a given period after the bus reset. The initiator can exclusively possess the access right to the target (right to use the bus) by performing the reconnect processing after the bus reset.

If the data transfer control system 10 receives an ORB2 including a command CMD2 after the reconnect processing (step S13), the data transfer control system 10 performs command comparison processing for comparing the contents of the ORB1 (CMD1) before the bus reset with the contents of the ORB2 after the bus reset, as indicated by D5 in FIG. 11 (step S14).

In this embodiment, a page table present flag P, data size, operation code (code which distinguishes a write command, read command, and the like) and data length in a command block (command set) field included in the ORB are compared, as shown in FIG. 12. In the case where the ORB includes identification information (sequence number, for example) of the ORB, the identification information may be compared. In the case where a page table is not used, values of data descriptors may be compared. In the case where a page table is used, the number of segments may be compared.

If the above information is compared, whether or not the ORB1 before the bus reset is the same as the ORB2 after the bus reset can be securely judged by using simple processing.

If the data transfer control system 10 judges that the contents of the ORB1 are the same as the contents of the ORB2, the data transfer control system 10 performs data transfer resume processing of the ORB1 (step S15). This enables data transfer to be resumed where the bus reset occurred as indicated by D6 in FIG. 11. The details of the data transfer resume processing are disclosed in Japanese Patent Application Laid-open No. 2001-177537.

Figure 13:
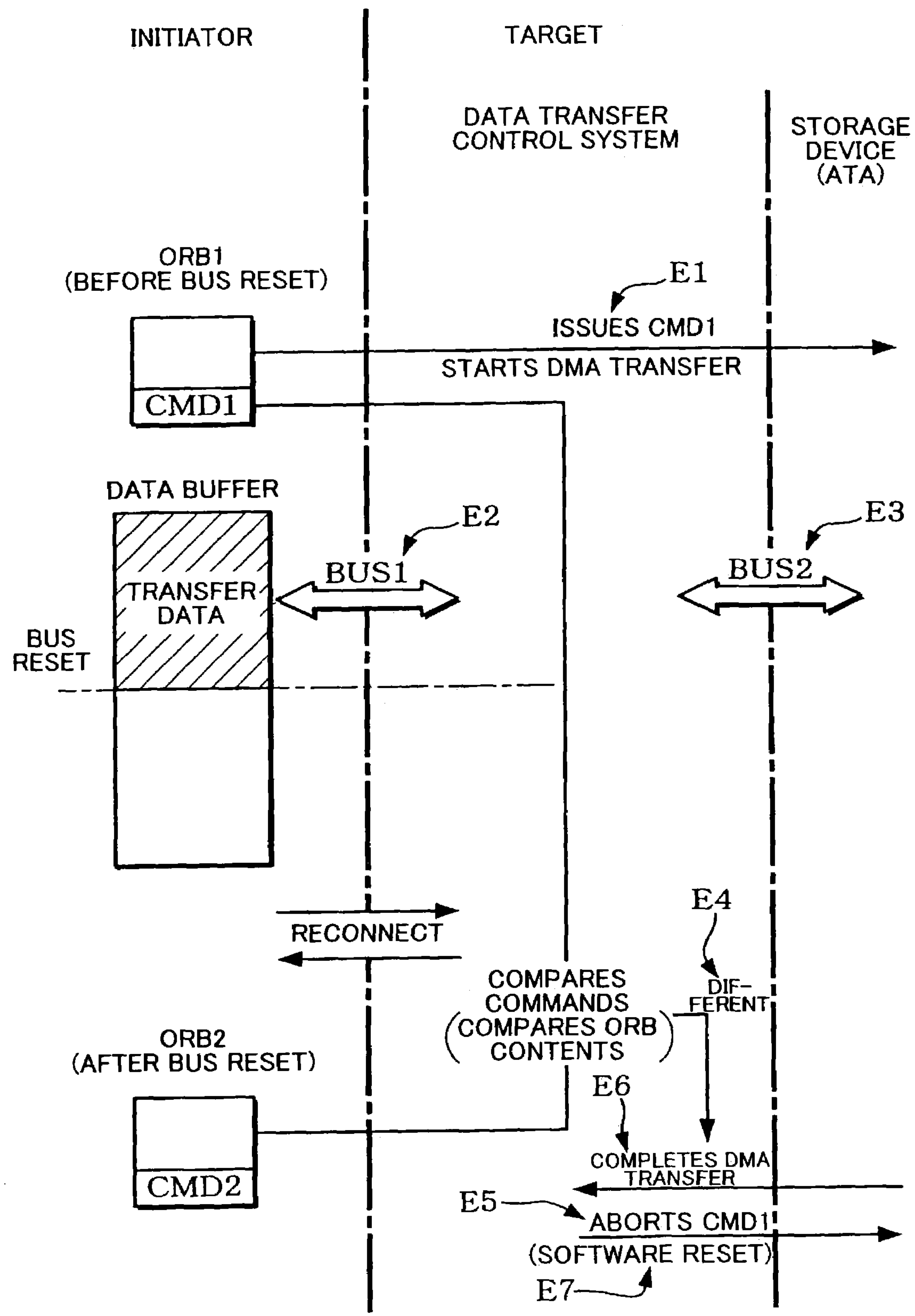
FIG. 13 is a diagram illustrative of command abort processing.

If the data transfer control system 10 judges that the contents of the ORB1 differ from the contents of the ORB2 as indicated by E4 in FIG. 13, the data transfer control system 10 judges whether or not the command CMD1 included in the ORB1 has been issued to the storage device 100 (step S16). If the command CMD1 has not been issued, the data transfer control system 10 transitions to processing of the ORB2 which has been newly sent without performing command abort processing (step S17). In this embodiment, in the case where the bus reset occurs during processing of the command CMD1, the data transfer control system 10 performs abort processing (step S21) if it is judged that the command CMD1 has been issued (step S16). If it is judged that the command CMD1 has not been issued (step S16), the data transfer control system 10 transitions to the processing of the ORB2 (step S17) without performing the abort processing.

If the command CMD1 has been issued to the storage device 100, the data transfer control system 10 judges whether or not the DMA transfer has been started (step S18). If the DMA transfer has been started, the data transfer control system 10 transitions to the abort processing of the command and CMD1, as indicated by E5 in FIG. 13 (step S21). If the command CMD1 has not been issued, the data transfer control system 10 judges whether or not the DMA transfer request signal DMARQ has been sent from the storage device 100 (step S19). If the signal DMARQ has not been sent from the storage device 100, the data transfer control system 10 transitions to the abort processing of the command CMD1. If the signal DMARQ has been sent from the storage device 100, the data transfer control system 10 orders start of DMA transfer (step S20), and transitions to the abort processing of the command CMD1. After the data transfer control system 10 finishes the abort processing of the command CMD1, the data transfer control system 10 transitions to the processing of the ORB2 (CMD2) (step S17).

Figure 10:
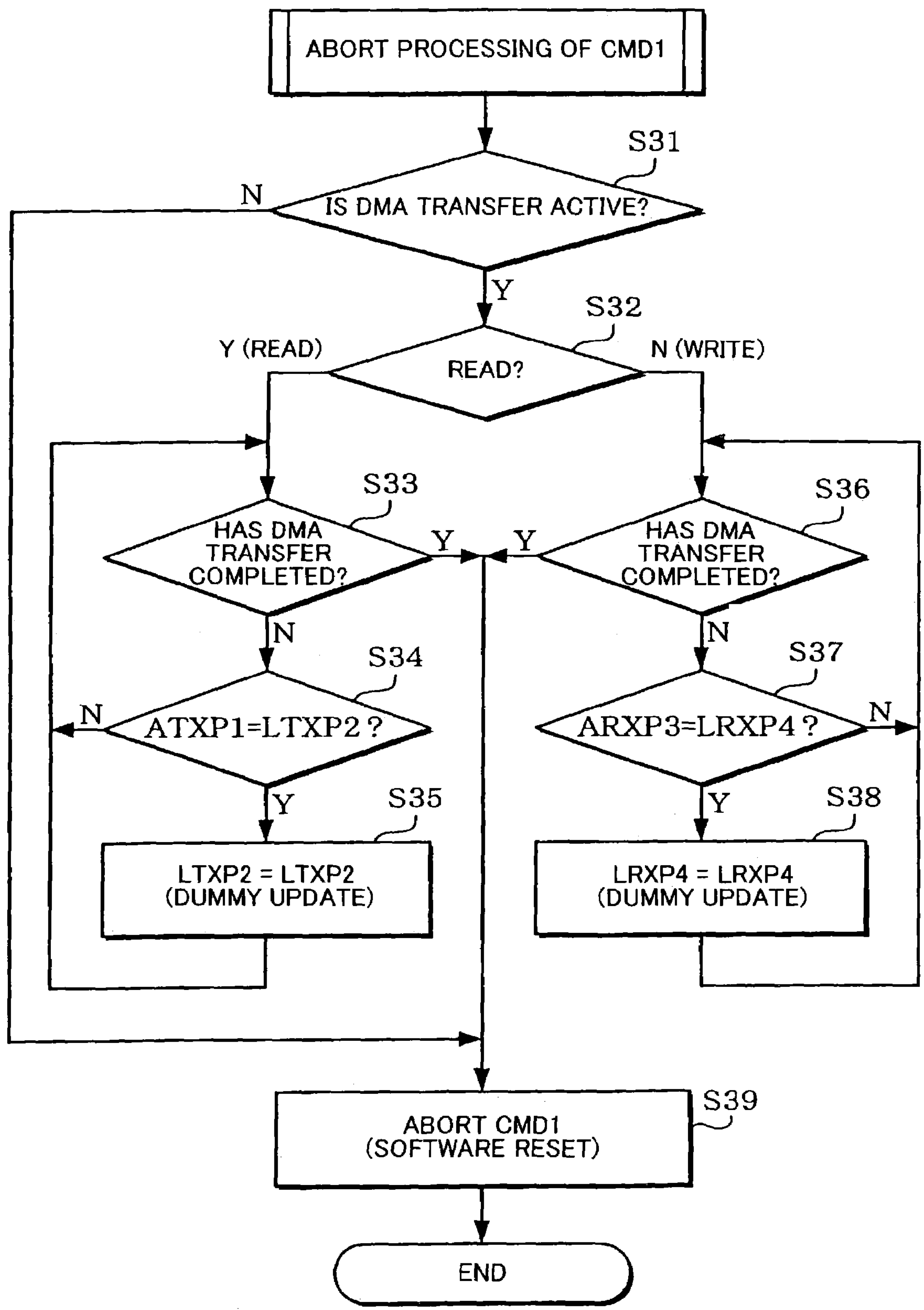
FIG. 10 is a flowchart showing a detailed processing according to one embodiment of the present invention.

FIG. 10 is a flowchart showing the abort processing of the command CMD1.

The data transfer control system 10 judges whether or not the DMA transfer is active (step S31). For example, if the data transfer control system 10 judges that the DMA transfer has not been started in the step S18 in FIG. 9 and that the signal DMARQ has not been sent in the step S19, the data transfer control system 10 judges that the DMA transfer is not active in the step S31 in FIG. 10. In this case, the data transfer control system 10 aborts the command CMD1 without performing the dummy data transfer control processing in steps S32 to S38. This enables the processing in the steps S32 to S38 to be omitted, whereby efficiency of the processing can be increased.

If the data transfer control system 10 judges that the DMA transfer is active, the data transfer control system 10 judges whether or not the command CMD1 is either a read command or a write command (step S32).

If the command CMD1 is a read command, the data transfer control system 10 judges whether or not the DMA transfer based on the command CMD1 has been completed (step S33). If the DMA transfer has not been completed, the data transfer control system 10 performs transfer processing of dummy data in the steps S33 to S35 between the data transfer control system 10 and the storage device 100 until the DMA transfer is completed. If the data transfer control system 10 judges that the DMA transfer has been completed, the data transfer control system 10 performs the abort processing of the command CMD1 as indicated by E7 in FIG. 13 (step S39).

If the command CMD1 is a write command, the data transfer control system 10 judges whether or not the DMA transfer based on the command CMD1 has been completed (step S36). If the DMA transfer has not been completed, the data transfer control system 10 performs transfer (write) processing of dummy data in the steps S36 to S38 between the data transfer control system 10 and the storage device 100 until the DMA transfer is completed. If the data transfer control system 10 judges that the DMA transfer has been completed, the data transfer control system 10 performs the abort processing of the command CMD1 (step S39).

The command abort processing may be implemented by a software reset defined in ATA/ATAPI, for example. In more detail, the software reset is executed by setting "1" in an SRST bit of a device control register included in the interface circuit 102 of the storage device 100. The value may be set in the register by allowing the interface circuit 30 to access the register of the interface circuit 102 by PIO transfer using BUS2 signals CS[1:0], DA[2:0], DIOW, DIOR, and the like as described later.

In this embodiment, the command CMD1 which has been issued to the storage device 100 before the bus reset (see step S3 in FIG. 9 and E1 in FIG. 13) is aborted after the DMA transfer (see steps S7 and S20 in FIG. 9 and E3 in FIG. 13) started based on the ORB1 (CMD1) is completed (see step S39 in FIG. 10 and E7 in FIG. 13).

This allows the command CMD1 to be aborted after the DMA transfer between the data transfer control system 10 and the storage device 100 through the bus BUS2 is completed normally. Therefore, since the storage device 100 can normally complete the DMA transfer, occurrence of a problem in which the storage device 100 hangs can be prevented. Moreover, since the DMA transfer through the bus BUS2 is preformed by dummy data transfer until the command CMD1 is aborted, the processing of the personal computer 2 is not adversely affected.

In particular, since the storage device 100 having an ATA (IDE)/ATAPI interface is originally designed as a built-in storage device for the personal computer 2, the storage device 100 is not designed taking occurrence of the IEEE 1394 bus reset during the DMA transfer into consideration. Therefore, if the storage device 100 is connected to the data transfer control system 10 in this embodiment having a bridge function between IEEE 1394 and ATA/ATAPI, the storage device 100 may hang due to occurrence of an unexpected bus reset. However, according to this embodiment, since the command is aborted after the DMA transfer is completed, occurrence of hang-up can be prevented.

4. Dummy Data Transfer

The transfer processing of dummy data in the steps S33 to S35 and S36 to S38 in FIG. 10 is described below with reference to FIGS. 14A to 14E and 15A to 15E.

FIGS. 14A to 14E are illustrative of pointer control of the packet buffer 40 in the case where the personal computer 2 reads data stored in the storage device 100 (data transfer control system 10 transmits data).

In FIGS. 14A to 14E, a pointer ATXP1 (first pointer) is a pointer for writing data transferred from the bus BUS2 (storage device 100, ATA/ATAPI) in the packet buffer 40. The pointer ATXP1 is updated each time data transferred from the bus BUS2 is written in the packet buffer 40. A pointer LTXP2 (second pointer) is a pointer for reading data transferred to the bus BUS1 (personal computer 2, IEEE 1394) from the packet buffer 40. The pointer LTXP2 is updated each time data transferred to the bus BUS1 is read from the packet buffer 40. These pointers are updated by the pointer management section 39.

Figure 14A:
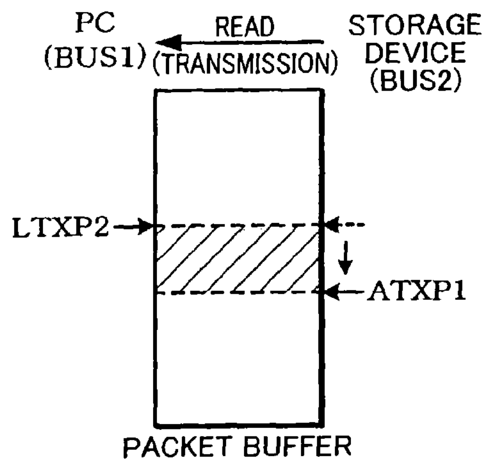
FIGS. 14A to 14E are diagrams for describing pointer control (in reading) for implementing processing of dummy data transfer.
Figure 14B:
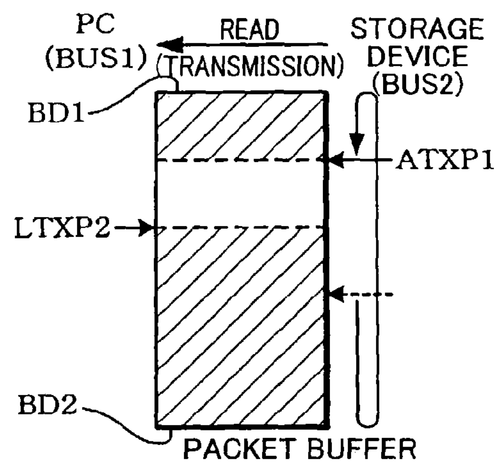

As shown in FIG. 14A, the pointer ATXP1 is updated each time data transferred from the bus BUS2 is written in the packet buffer 40 by the interface circuit 30, and a location indicated by the pointer ATXP1 is moved downward (in the data storage direction). The pointer ATXP1 is managed by using a ring buffer. Therefore, when the pointer ATXP1 reaches a lower boundary BD2 of the storage region, the pointer ATXP1 is returned (rings) to an upper boundary BD1 of the storage region, as shown in FIG. 14B.

Figure 14C:
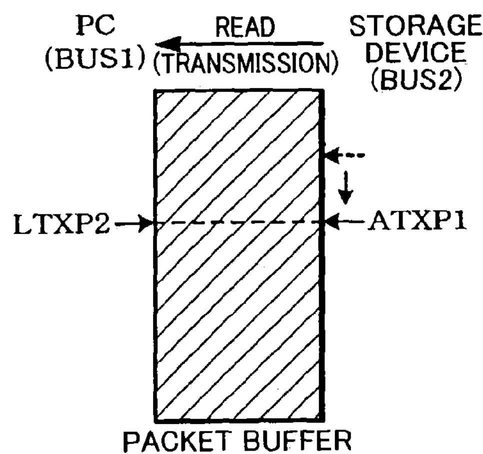

If it is judged that ATXP1=LTXP2 (step S34 in FIG. 10), data is stored in the entire storage region of the packet buffer 40, as shown in FIG. 14C. In FIGS. 14A to 14E, a portion indicated by slanted lines designates the stored data.

Figure 14D:
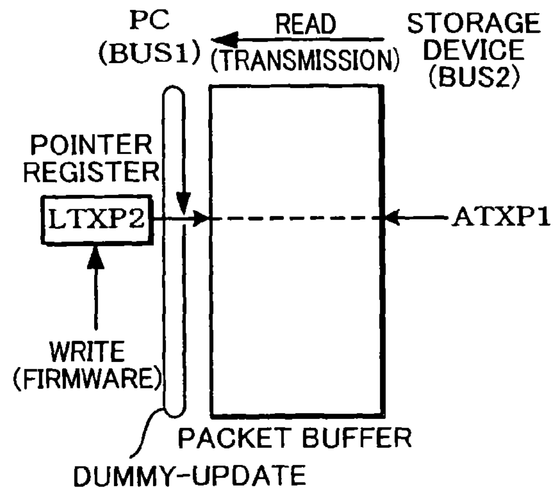
Figure 14E:
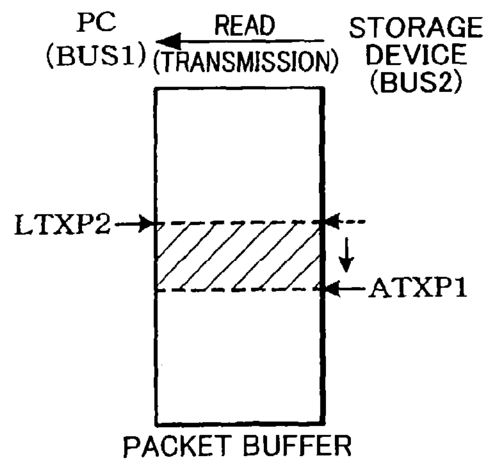

In this embodiment, the same value is rewritten in the pointer register of the pointer LTXP2 as shown in FIG. 14D (step S35 in FIG. 10). This allows a dummy update on the pointer LTXP2, whereby a result in which data stored in the entire storage region is read is obtained. The pointer ATXP1 is then updated as shown in FIG. 14E, whereby data transferred from the bus BUS2 is written in the storage region from which data is read imitatively. The pointer control shown in FIG. 14A to 14E is repeated until the DMA transfer is completed (step S33 in FIG. 10) so that dummy data is transferred between the data transfer control system 10 and the storage device 100 through the bus BUS2.

In this embodiment, transfer control of dummy data is implemented by performing a dummy update on the pointer LTXP2 so that the pointer ATXP1 (first pointer) which is updated each time data transferred from the bus BUS2 is written in the packet buffer 40 does not go ahead of the pointer LTXP2 (second pointer).

FIGS. 15A to 15E are illustrative of pointer control of the packet buffer 40 in the case where the personal computer 2 writes data in the storage device 100 (data transfer control system 10 receives data).

In FIGS. 15A to 15E, a pointer ARXP3 (third pointer) is a pointer for reading data transferred to the bus BUS2 from the packet buffer 40. The pointer ARXP3 is updated each time data transferred to the bus BUS2 is read from the packet buffer 40. A pointer LRXP4 (fourth pointer) is a pointer for writing data transferred from the bus BUS1 in the packet buffer 40. The pointer LRXP4 is updated each time data transferred from the bus BUS1 is written in the packet buffer 40. These pointers are updated by the pointer management section 39.

Figure 15A:
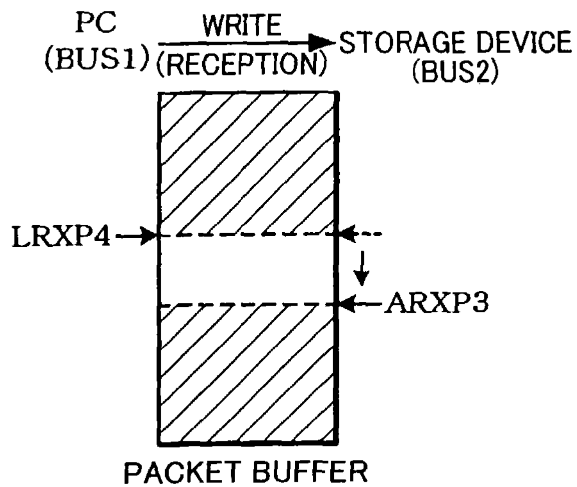
FIGS. 15A to 15E are diagrams for describing pointer control (in writing) for implementing processing of dummy data transfer.
Figure 15B:
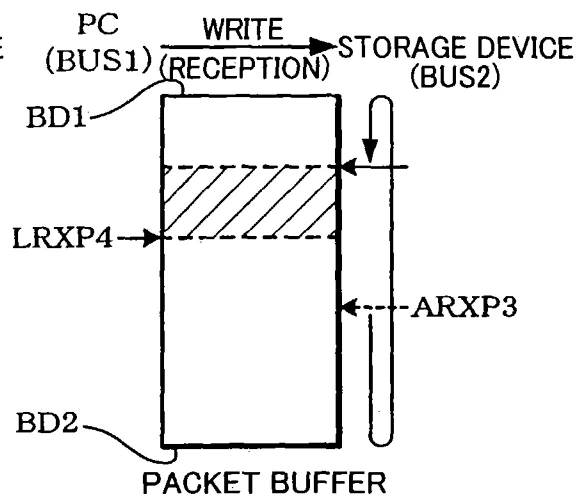

As shown in FIG. 15A, the pointer ARXP3 is updated each time data transferred to the bus BUS2 is read from the packet buffer 40, and a location indicated by the pointer ARXP3 is moved downward. The pointer ARXP3 is managed by using a ring buffer. Therefore, if the pointer ARXP3 reaches the lower boundary BD2, the pointer ARXP3 is returned to the upper boundary BD1.

Figure 15C:
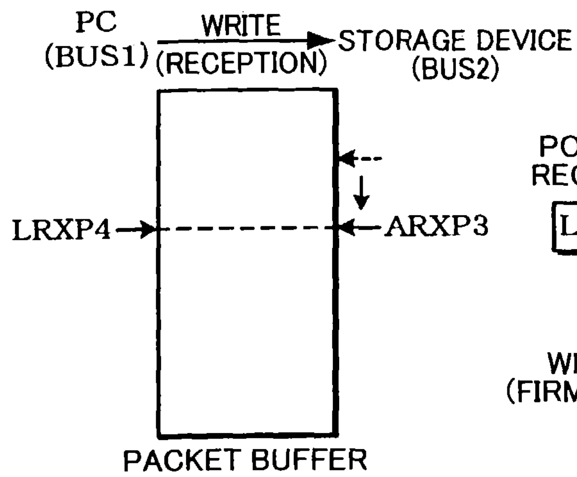

If it is judged that ARXP3=LRXP4 (step S37 in FIG. 10), data is read from the entire storage region of the packet buffer 40, as shown in FIG. 15C.

Figure 15D:
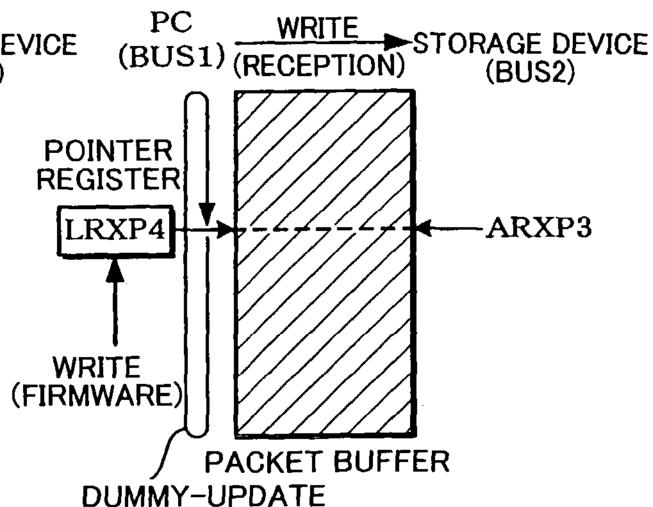
Figure 15E:
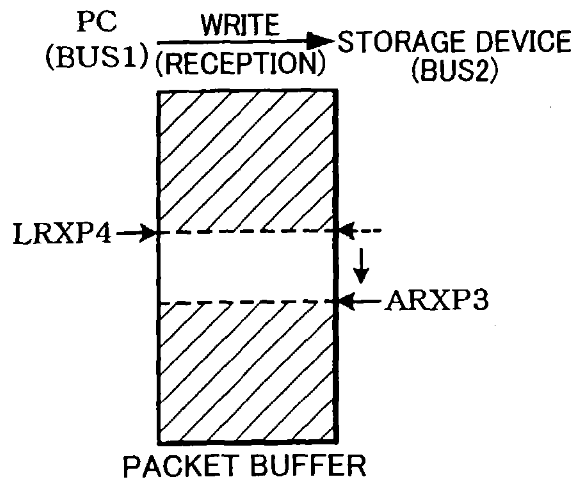

In this embodiment, the same value is rewritten in the pointer register of the pointer LRXP4 as shown in FIG. 15D (step S38 in FIG. 10). This allows a dummy update on the pointer LRXP4, whereby a result in which the data is written in the entire storage region is obtained. The pointer ARXP3 is then updated as shown in FIG. 15E, whereby data transferred to the bus BUS2 is read from the storage region in which data is written imitatively. The pointer control shown in FIG. 15A to 15E is repeated until the DMA transfer is completed (step S36 in FIG. 10) so that dummy data is transferred between the data transfer control system 10 and the storage device 100 through the bus BUS2.

In this embodiment, the transfer control of dummy data is implemented by performing a dummy update on the pointer LRXP4 so that the pointer ARXP3. (third pointer) which is updated each time data transferred to the bus BUS2 is read from the packet buffer 40 does not go ahead of the pointer LRXP4 (fourth pointer).

In this embodiment, dummy data is transferred imitatively between the data transfer control system 10 and the storage device 100 through the bus BUS2 until the DMA transfer is completed, and the command CMD1 is aborted after the DMA transfer is completed. The personal computer 2 imitatively reads or writes transferred data by performing a dummy update on the pointers LTXP2 and LRXP4, as shown in FIGS. 14D and 15D. Therefore, the processing of the personal computer 2 can be prevented from being adversely affected if the DMA transfer is continued until the command CMD1 is aborted. This enables the ORB2 (CMD2) newly sent from the personal computer 2 after the, bus reset to be appropriately processed after the command CMD1 is aborted.

The method of doing a dummy update on the pointers LTXP2 and LRXP4 is not limited to the method shown in FIGS. 14A to 15D. It suffices that the pointers LTXP2 and LRXP4 be controlled so that at least the pointers ATXP1 and ARXP3 do not go ahead of the pointers LTXP2 and LRXP4. The transfer processing of dummy data may be implemented by providing a hardware circuit exclusive for the dummy data transfer instead of the pointer control shown in FIGS. 14A to 15D.

5. ATA/ATAPI Interface Circuit

Figure 16:
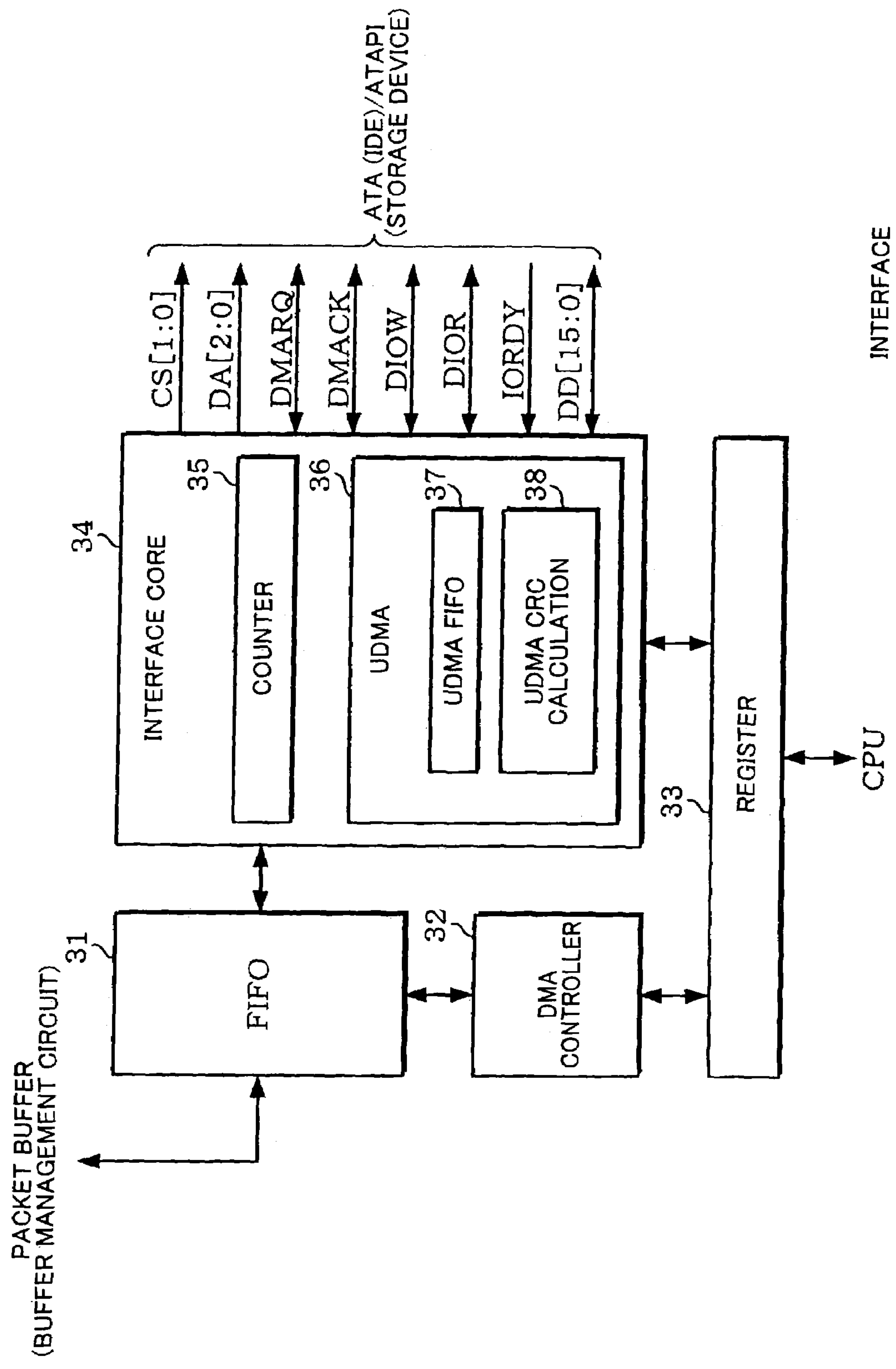
FIG. 16 is a diagram showing a configurational example of an ATA/ATAPI interface circuit.

FIG. 16 shows a configuration example of the ATA/ATAPI interface circuit 30. The interface circuit 30 does not necessarily include all the circuit blocks shown in FIG. 16. Some of the circuit blocks may be omitted.

A FIFO 31 is a buffer for adjusting (buffering) the difference in data transfer rate. A DMA controller 32 is a circuit which controls (REQ/ACK control) the FIFO 31 and an interface core circuit 34.

The interface core circuit 34 is a circuit which controls DMA transfer and the like. A counter 35 included in the interface core circuit 34 is an ATA (IDE)/ATAPI reset counter. A UDMA circuit 36 included in the interface core circuit 34 is a circuit for controlling ATA/ATAPI UltraDMA transfer. The UDMA circuit 36 includes a UltraDMA FIFO 37 and a UltraDMA CRC calculation circuit 38.

A register 33 is a register for controlling initiation of DMA transfer and the like. The register 33 is accessible by the firmware 50 (CPU 42).

A signal CS[1:0] is a chip select signal used to access each ATA register. A signal DA[2:0] is an address signal for accessing data or a data port.

The signals DMARQ and DMACK are signals used for DMA transfer. The storage device 100 (device) activates (asserts) the signal DMARQ when preparations for data transfer are completed, and the data transfer control system 10 (host) activates the signal DMACK when initiating the DMA transfer in response to the signal DMARQ.

A signal DIOW (STOP) is a write signal used to write data in a register or a data port. The signal DIOW functions as a STOP signal during UrtraDMA transfer. A signal DIOR (HDMARDY, HSTROBE) is a read signal used to read data from a register or a data port. The signal DIOR functions as an HDMARDY/HSTROBE signal during UrtraDMA transfer.

A signal IORDY (DDMARDY, DSTROBE) is used as a wait signal or the like when the storage device 100 does not complete preparations for data transfer. The signal IORDY functions as a DDMARDY/DSTROBE signal during UrtraDMA transfer.

FIGS. 17A to 19B show signal waveform examples of the above ATA signals. In FIGS. 17A to 19B, "#" designates that the signal is a negative logic signal (active at L level).

Figure 17A:
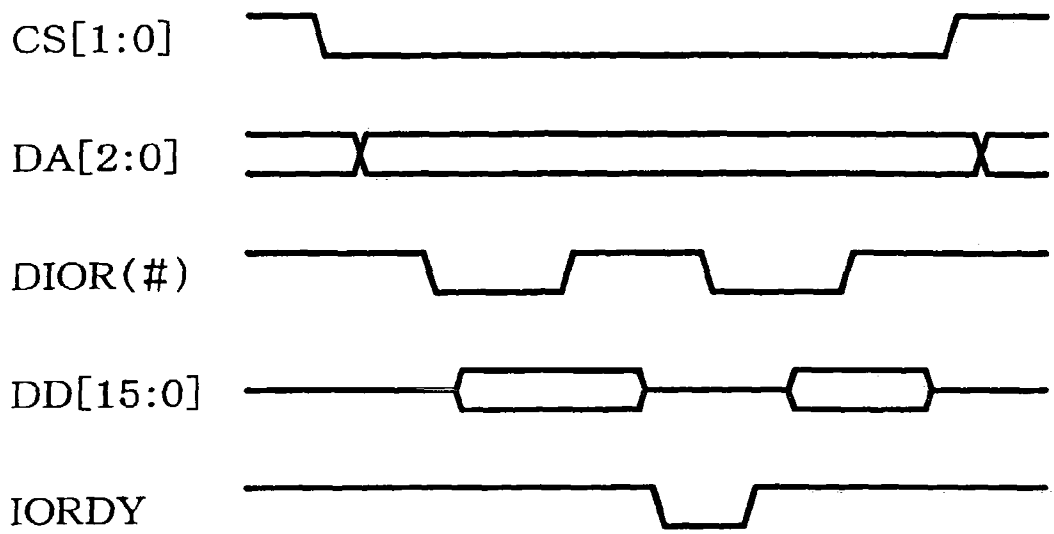
FIGS. 17A and 17B are waveform charts showing signal waveform examples during PIO reading and PIO writing.
Figure 17B:
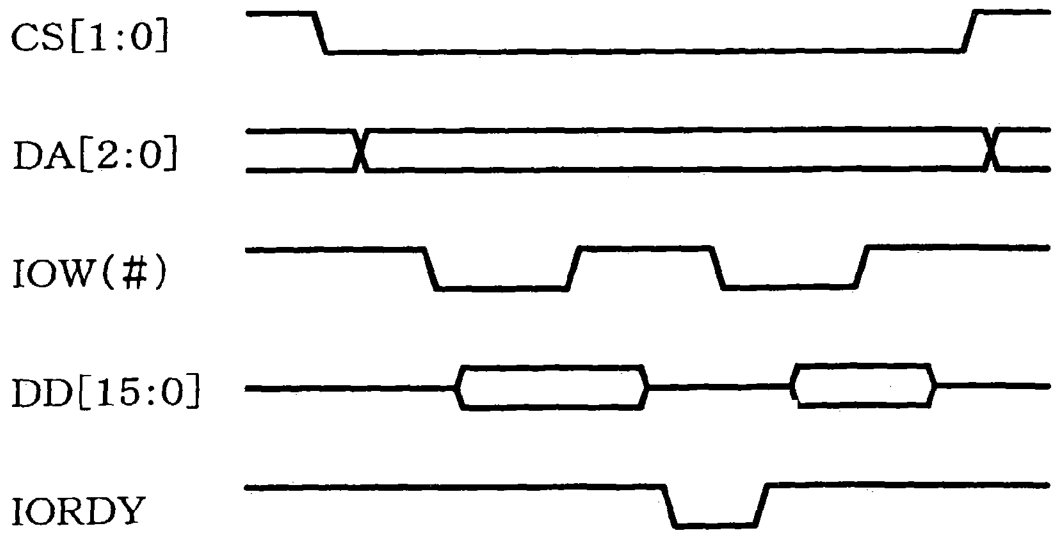

FIGS. 17A and 17B are signal waveform examples during PIO (Parallel I/O) reading and PIO writing. The ATA status register is read by the PIO reading shown in FIG. 17A. The control register is written by the PIO writing shown in FIG. 17B. For example, a software reset for aborting a command issued to the storage device 100 is generated by setting "1" in the SRST bit of the register of the interface circuit 102 by the PIO writing shown in FIG. 17B.

Figure 18A:
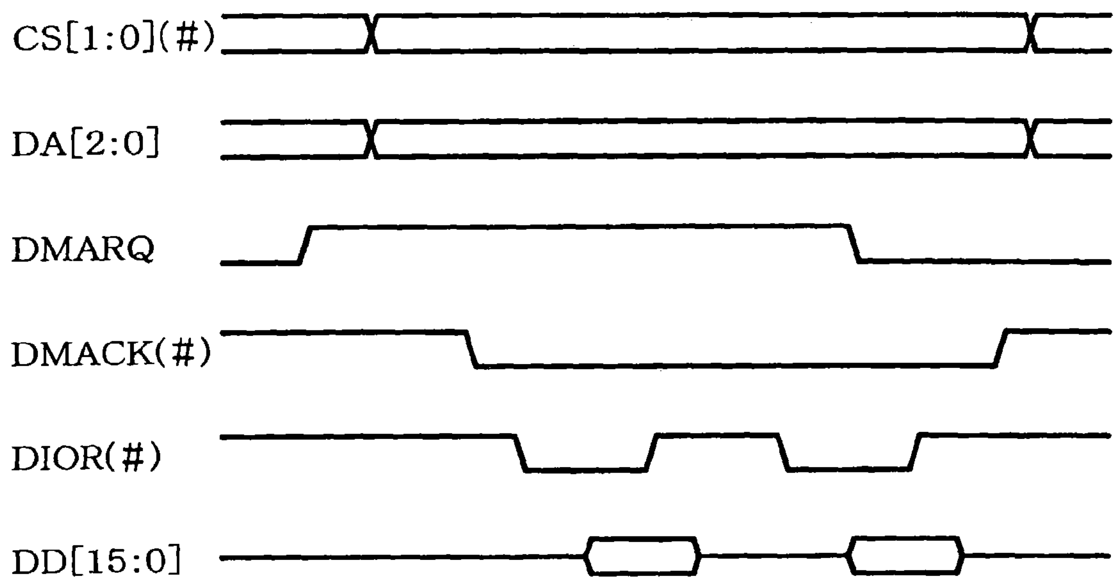
FIGS. 18A and 18B are waveform charts showing signal waveform examples during DMA reading and DMA writing.
Figure 18B:
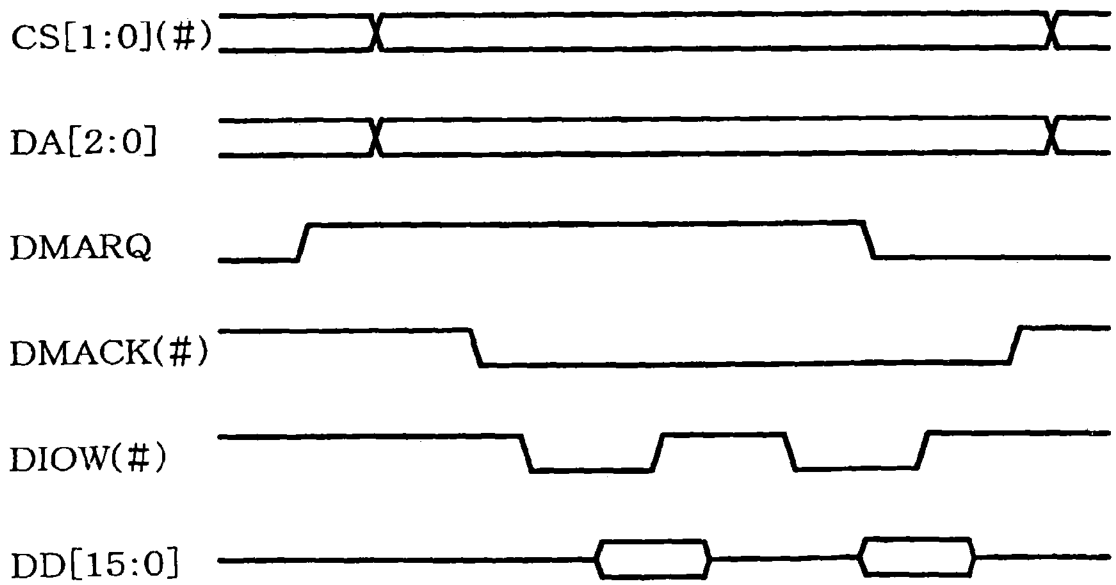

FIGS. 18A and 18B are signal waveform examples during DMA reading and DMA writing. The storage device 100 (interface circuit 102) activates the signal DMARQ (H level) when preparations for data transfer are completed. The data transfer control system 10 (interface circuit 30) activates the signal DMACK (L level) in response to the signal DMARQ to initiate DMA transfer. The DMA transfer of data DD[15:0] is performed by using the signal DIOR (during reading) or DIOW (during writing).

Figure 19A:
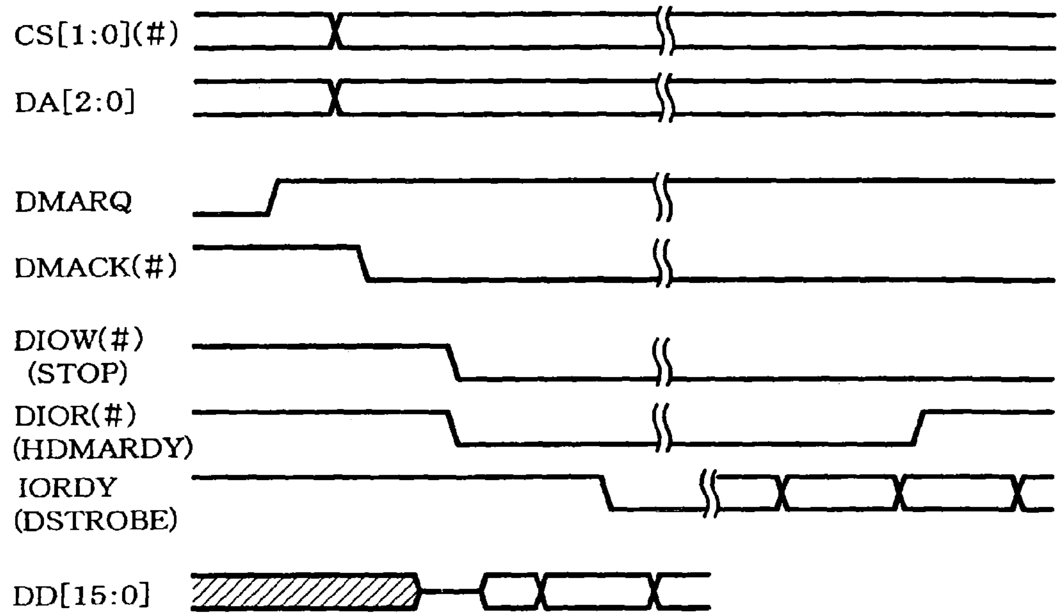
FIGS. 19A and 19B are waveform charts showing signal waveform examples during UltraDMA reading and UltraDMA writing.
Figure 19B:
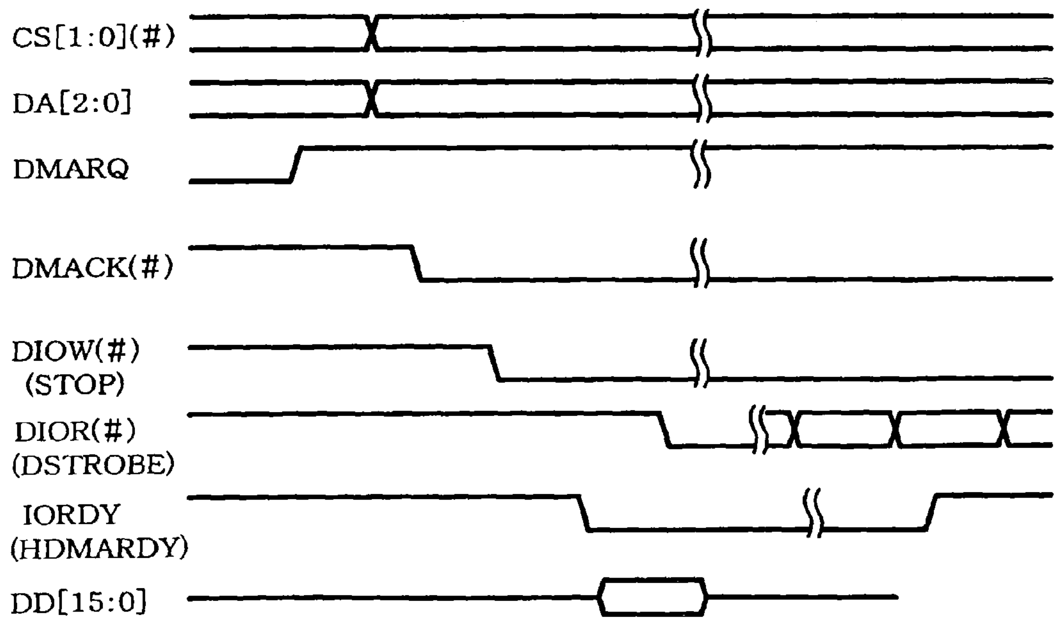

FIGS. 19A and 19B are signal waveform examples during UltraDMA reading and UltraDMA writing. The storage device 100 activates the signal DMARQ when preparations for data transfer are completed. The data transfer control system 10 activates the signal DMACK in response to the signal DMARQ to initiate DMA transfer. The UltraDMA transfer of data DD[15:0] is performed by using the signals DIOW, DIOR, and IORDY.

Note that the present invention is not limited to the above-described embodiments, and various modifications can be made within the scope of the invention.

For example, in part of this specification, terms such as IEEE 1394, ATA/ATAPI, SBP-2, IPover1394, ORB, a personal computer/storage device, a hard disk drive/optical disk drive, a storage device and CPU are replaced by terms in a broader sense such as a first interface standard, a second interface standard, a first higher level protocol of the first interface standard, a second higher level protocol of the first interface standard, a command packet, an electronic instrument, a storage device, a device and a processor, but these terms may be replaced also in another part of the specification.

Part of requirements of any claim of the present invention could be omitted from a dependent claim which depends on that claim. Moreover, part of requirements of any independent claim of the present invention could be made to depend on any other independent claim.

The configuration of the data transfer control system and the electronic instrument of the present invention is not limited to the configuration shown in FIG. 8, and various modifications are possible. For example, part of the circuit blocks and the functional blocks shown in FIGS. 9 and 18 may be omitted, or the connection between the blocks may be modified. The second bus (BUS2) may be connected to a device other than the storage device. The connection of the physical layer circuit, the link layer circuit, and the packet buffer is not limited to the connection shown in FIG. 8.

Although the embodiments illustrate the case where the functions of the command processing section, command abort section, command comparison section, transfer resume section, and the like are implemented by the firmware (program), part or all of these functions may be implemented by hardware.

The present invention is particularly useful for the bus reset in IEEE 1394. However, the present invention may be applied to another reset which clears at least the node topology information. The present invention may be applied to command abort processing performed in the time other than the bus reset.

The present invention may be applied to various types of electronic appliances (such as hard disk drives, optical disk drives, magneto-optical disc drives, PDAs, expansion devices, audio devices, digital video cameras, portable telephones, printers, scanners, TVs, VCRs, telephones, display devices, projectors, personal computers, or electronic notebooks).

The embodiments of the present invention describe the case where the present invention is applied to the data transfer conforming to the IEEE 1394, SBP-2, and ATA/ATAPI standards. However, the present invention may be applied to data transfer conforming to standards based on concepts similar to those of the IEEE 1394 (P1394a), SBP-2 (SBP), and ATA/ATAPI, or on standards developed from the IEEE 1394, SBP-2, and ATA/ATAPI.

The specification discloses the following matters about the configuration of the embodiments described above.

According to one embodiment of the present invention, there is provided a data transfer control system for data transfer through a bus, comprising:

a command processing section which receives a command packet transferred through a first bus, issues a command indicated by the command packet to a device connected to a second bus, and orders start of a direct memory access (DMA) transfer through the second bus; and a command abort section which aborts the command issued to the device connected to the second bus based on the command packet after the completion of the DMA transfer started based on the command packet.

In this data transfer control system, the command indicated by the command packet transferred through the first bus is issued to the device connected to the second bus, and the DMA transfer is started. The command issued to the device connected to the second bus is aborted (or cancelled) after the completion of the DMA transfer. This prevents occurrence of a problem such as a hang-up of the device connected to the second bus when the DMA transfer is terminated abnormally, whereby the command issued to the device can be aborted appropriately. Note that the first bus may be a bus which transfers data conforming to a first interface standard and the second bus may be a bus which transfers data conforming to a second interface standard, for example.

The data transfer control system may further comprise a command comparison section which compares contents of a first command packet transferred through the first bus before a bus reset with contents of a second command packet transferred through the first bus after the bus reset, when the bus reset that clears node topology information has occurred during the processing of the first command packet, wherein the command abort section may abort a command which has been issued to the device connected to the second bus based on the first command packet after completion of a DMA transfer which has been started based on the first command packet, when the contents of the first command packet are determined to be different from the contents of the second command packet.

If the contents of the first and second command packets are determined to be the same, the data transfer can be resumed from the point of the bus reset occurrence.

In this data transfer control system, when a bus reset that clears node topology information occurs during processing of a first command packet, in a case where a command of the first command packet has been issued to the device connected to the second bus, the command of the first command packet may be aborted, and in a case where the command of the first command packet has not been issued to the device connected to the second bus, processing of a second command packet may start without aborting the command of the first command packet.

In this data transfer control system, the command abort section may control dummy data transfer to or from the device connected to the second bus until the completion of the DMA transfer.

In this case, dummy data transfer control may be implemented by performing a dummy update on a pointer of a packet buffer which temporarily stores transferred data, or by providing hardware for dummy data transfer. The dummy data may be data which is transferred through the second bus, but is not transferred through the first bus, for example.

In this data transfer control system, the command abort section may abort a command without controlling dummy data transfer when any DMA transfer is not being performed in determination of whether or not the command is to be aborted.

This enables the processing of dummy data transfer control to be omitted, whereby processing efficiency can be improved.

The data transfer control system may further comprise:

a pointer management section which manages pointers for a packet buffer which is a ring buffer and temporarily stores transferred data, the pointer management section updating a first pointer each time when data transferred from the second bus is written in the packet buffer, and also updating a second pointer each time when data to be transferred to the first bus is read from the packet buffer, wherein the command abort section may control dummy data transfer by performing a dummy update on the second pointer so that the first pointer does not go ahead of the second pointer.

The data transfer control system may further comprise:

a pointer management section which manages pointers for a packet buffer which is a ring buffer and temporarily stores transferred data, the pointer management section updating a third pointer each time when data to be transferred to the second bus is read from the packet buffer, and also updating a fourth pointer each time when data transferred from the first bus is written in the packet buffer, wherein the command abort section controls dummy data transfer by performing a dummy update on the fourth pointer so that the third pointer does not go ahead of the fourth pointer.

In this data transfer control system, the first bus may transfer data conforming to the IEEE 1394 standard, and the second bus may transfer data conforming to the Advanced Technology Attachment/Advanced Technology Attachment Packet Interface (ATA/ATAPI) standard.

According to another embodiment of the present invention, there is provided an electronic instrument comprising any of the above data transfer control systems and the device connected to the second bus.

According to further embodiment of the present invention, there is provided a program causing a data transfer control system to function as:

a command processing section which receives a command packet transferred through a first bus, issues a command indicated by the command packet to a device connected to a second bus, and orders the start of a direct memory access (DMA) transfer through the second bus; and a command abort section which aborts the command issued to the device connected to the second bus based on the command packet after the completion of the DMA transfer started based on the command packet.

According to still another embodiment of the present invention, there is provided a data transfer control method for data transfer through a bus, the method comprising:

issuing a command indicated by a command packet transferred through a first bus, to a device connected to a second bus, and ordering start of a direct memory access (DMA) transfer through the second bus; and aborting the command issued to the device connected to the second bus based on the command packet after the completion of the DMA transfer started based on the command packet.

What is claimed is:

1. A data transfer control system for data transfer through a bus, comprising:

a command processing section which receives a command packet transferred through a first bus, issues a command indicated by the command packet to a device connected to a second bus, and orders start of a direct memory access (DMA) transfer through the second bus;

a command comparison section which compares contents of a first command packet transferred through the first bus before a bus reset with contents of a second command packet transferred through the first bus after the bus reset, when the bus reset that clears node topology information has occurred during the processing of the first command packet; and a command abort section which waits for completion of a DMA transfer which has been started based on the first command packet, and aborts the command which has been issued to the device connected to the second bus based on the first command packet after the completion of a DMA transfer of the first command packet, when the contents of the first command packet are determined to be different from the contents of the second command packet.

2. The data transfer control system as defined in claim 1, wherein:

when a bus reset that clears node topology information occurs during processing of a first command packet, in a case where a command of the first command packet has been issued to the device connected to the second bus, the command of the first command packet is aborted, and in a case where the command of the first command packet has not been issued to the device connected to the second bus, processing of a second command packet starts without aborting the command of the first command packet.

3. The data transfer control system as defined in claim 1, wherein the command abort section controls dummy data transfer to or from the device connected to the second bus until the completion of the DMA transfer.

4. The data transfer control system as defined in claim 3, wherein the command abort section aborts a command without controlling dummy data transfer when any DMA transfer is not being performed in determination of whether or not the command is to be aborted.

5. The data transfer control system as defined in claim 3, further comprising:

a pointer management section which manages pointers for a packet buffer which is a ring buffer and temporarily stores transferred data, the pointer management section updating a first pointer each time when data transferred from the second bus is written in the packet buffer, and also updating a second pointer each time when data to be transferred to the first bus is read from the packet buffer, wherein the command abort section controls dummy data transfer by performing a dummy update on the second pointer so that the first pointer does not go ahead of the second pointer.

6. The data transfer control system as defined in claim 3, further comprising:

a pointer management section which manages pointers for a packet buffer which is a ring buffer and temporarily stores transferred data, the pointer management section updating a third pointer each time when data to be transferred to the second bus is read from the packet buffer, and also updating a fourth pointer each time when data transferred from the first bus is written in the packet buffer, wherein the command abort section controls dummy data transfer by performing a dummy update on the fourth pointer so that the third pointer does not go ahead of the fourth pointer.

7. The data transfer control system as defined in claim 1, wherein the first bus transfers data conforming to the IEEE 1394 standard, and the second bus transfers data conforming to the Advanced Technology Attachment/Advanced Technology Attachment Packet Interface (ATA/ATAPI) standard.

8. An electronic instrument comprising:

the data transfer control system as defined in claim 1; and the device connected to the second bus.

9. A data transfer control method for data transfer through a bus, the method comprising:

issuing a command indicated by a command packet transferred through a first bus, to a device connected to a second bus, and ordering start of a direct memory access (DMA) transfer through the second bus;

comparing contents of a first command packet transferred through the first bus before a bus reset with contents of a second command packet transferred through the first bus after the bus reset, when the bus reset that clears node topology information has occurred during the processing of the first command packet;

waiting for completion of a DMA transfer which has been started based on the first command packet; and aborting a command which has been issued to the device connected to the second bus based on the first command packet after completion of the DMA transfer of the first command packet, when the contents of the first command packet are determined to be different from the contents of the second command packet.

10. The data transfer control method as defined in claim 9, when a bus reset that clears node topology information occurs during processing of a first command packet, further comprising:

aborting a command of the first command packet, in a case where the command of the first command packet has been issued to the device connected to the second bus; and starting processing of a second command packet without aborting the command of the first command packet, in a case where the command of the first command packet has not been issued to the device connected to the second bus.

11. The data transfer control method as defined in claim 9, further comprising:

controlling dummy data transfer to or from the device connected to the second bus until the completion of the DMA transfer.

12. The data transfer control method as defined in claim 11, further comprising:

aborting a command without controlling dummy data transfer when any DMA transfer is not being performed in determination of whether or not the command is to be aborted.

13. The data transfer control method as defined in claim 11, further comprising:

managing pointers for a packet buffer which is a ring buffer and temporarily stores transferred data, a first pointer being updated each time when data transferred from the second bus is written in the packet buffer, and a second pointer being updated each time when data to be transferred to the first bus is read from the packet buffer; and controlling dummy data transfer by performing a dummy update on the second pointer so that the first pointer does not go ahead of the second pointer.

14. The data transfer control method as defined in claim 11, further comprising:

managing pointers for a packet buffer which is a ring buffer and temporarily stores transferred data, a third pointer being updated each time when data to be transferred to the second bus is read from the packet buffer, and a fourth pointer being updated each time when data transferred from the first bus is written in the packet buffer; and controlling dummy data transfer by performing a dummy update on the fourth pointer so that the third pointer does not go ahead of the fourth pointer.

15. The data transfer control method as defined in claim 9, wherein the first bus transfers data conforming to the IEEE 1394 standard and the second bus transfers data conforming to the Advanced Technology Attachment/Advanced Technology Attachment Packet Interface (ATA/ATAPI) standard.

* * * * *